(12) United States Patent
Hashimoto et al.

(10) Patent No.: US 7,178,069 B2
(45) Date of Patent: Feb. 13, 2007

(54) ELECTRONIC CONTROL UNIT

(75) Inventors: Kohji Hashimoto, Tokyo (JP); Katsuya Nakamoto, Tokyo (JP); Yuki Iwagami, Tokyo (JP); Akihiro Ishii, Tokyo (JP)

(73) Assignee: Mitsubishi Denki Kabushiki Kasiha, Tokyo (JP)

( * ) Notice: Subject to any disclaimer, the term of this patent is extended or adjusted under 35 U.S.C. 154(b) by 441 days.

(21) Appl. No.: 10/788,439

(22) Filed: Mar. 1, 2004

(65) Prior Publication Data
US 2005/0034015 A1   Feb. 10, 2005

(30) Foreign Application Priority Data
Aug. 8, 2003   (JP)   ............ P2003-290006

(51) Int. Cl.
*G06F 11/00*   (2006.01)
(52) U.S. Cl. ............... 714/47; 714/11; 714/18; 714/48; 714/49; 701/1; 701/36
(58) Field of Classification Search ............... 714/11, 714/18, 48, 49, 47; 701/1, 36
See application file for complete search history.

(56) References Cited

U.S. PATENT DOCUMENTS

| | | | |
|---|---|---|---|
| 5,812,880 A * | 9/1998 | Goto et al. | 710/37 |
| 5,966,305 A * | 10/1999 | Watari et al. | 700/82 |
| 6,678,586 B2 * | 1/2004 | Nakamoto et al. | 701/1 |
| 2002/0035650 A1* | 3/2002 | Nakamoto et al. | 710/5 |
| 2002/0040261 A1* | 4/2002 | Nakamoto et al. | 701/1 |

FOREIGN PATENT DOCUMENTS

| | | |
|---|---|---|
| JP | 09-162814 A | 6/1997 |
| JP | 2000-267948 A | 9/2000 |
| JP | 2002-108835 A | 4/2002 |
| JP | 2002-235598 A | 8/2002 |
| JP | 2002-333901 A | 11/2002 |

\* cited by examiner

*Primary Examiner*—Robert W. Beausoliel, Jr.
*Assistant Examiner*—Charles Ehne
(74) *Attorney, Agent, or Firm*—Sughrue Mion, PLLC

(57) ABSTRACT

An electronic control unit includes a serial communication circuit capable of easily confirming presence or absence of communication error while regular transmission/regular report between master station and sub station are performed timely. First and second control circuit sections 200*a* (master station) and 200*b* (substation) communicate mutually via series-parallel converters 117, 127. The master station includes regular transmission device 201 and irregular transmission device 211. The substation includes regular report device 221, confirmation reply device 205 and report reply device 215 relative to transmission data from the master station, and unprocessed data table 204. The confirmation reply device 205 and report reply device 215 confirm whether or not downstream communication from the master station to sub station is normal. When any error is present in regular report data through upstream communication, the error is confirmed on the fact the irregular transmission device 211 makes retransmission readout request.

18 Claims, 15 Drawing Sheets

| ADDRESS | b7 | b6 | b5 | b4 | b3 | b2 | b1 | b0 | |
|---|---|---|---|---|---|---|---|---|---|
| 00 | | | | | | | | | REGULAR REPORT PERMISSION |
| 01 | | | | | | | | | NORMAL-SIDE LIMIT VALUE |
| 02 | | | | | | | | | ABNORMAL-SIDE LIMIT VALUE |
| 03 | | | | | | | | | INITIALIZATION VALUE |
| 04 | | | | | | | | | FIRST VARIATION VALUE |
| 05 | | | | | | | | | SECOND VARIATION VALUE |
| 06 | | | | | | | | | THIRD VARIATION VALUE |
| 07 | | | | | | | | | REPLY RESPONSE ACCEPTABLE TIME PERIOD |
| 08 | | | | | | | | | RECEIVING INTERVAL ACCEPTABLE TIME PERIOD |
| 09 | | | | | | | | | |
| 0A | Y07 | Y06 | Y05 | Y04 | Y03 | Y02 | DR2 | DR1 | INDIRECT OUTPUT 1 |
| 0B | Y17 | Y16 | Y15 | Y14 | Y13 | Y12 | Y11 | Y10 | INDIRECT OUTPUT 2 |

REGULAR TRANSMISSION ORDER IS ALTERNATE TRANSMISSION OF 0A AND 0B

FIG. 12

| ADDRESS | b7 | b6 | b5 | b4 | b3 | b2 | b1 | b0 | | |
|---|---|---|---|---|---|---|---|---|---|---|
| 10 | FLAG | | INPUT ADDRESS | | ADDITION AND SUBTRACTION CURRENT VALUE | | | | | STATUS MEMORY |
| 11 | 0H | | | | 0H | | | | | |
| | X07 | X06 | X05 | X04 | X03 | X02 | X01 | X00 | | INDIRECT OUTPUT 1 |
| | X17 | X16 | X15 | X14 | X13 | X12 | X11 | X10 | | INDIRECT OUTPUT 2 |
| 12 | UPPER 8 BITS | | | | | | | | | ANALOG 1 |
| | LOWER 8 BITS | | | | | | | | | |
| 13 | UPPER 8 BITS | | | | | | | | | ANALOG 2 |
| | LOWER 8 BITS | | | | | | | | | |
| 14 | UPPER 8 BITS | | | | | | | | | ANALOG 3 |
| | LOWER 8 BITS | | | | | | | | | |
| 15 | UPPER 8 BITS | | | | | | | | | ANALOG 4 |
| | LOWER 8 BITS | | | | | | | | | |
| 16 | UPPER 8 BITS | | | | | | | | | ANALOG 5 |
| | LOWER 8 BITS | | | | | | | | | |
| 17 | BIT SECTION | | | | ADDRESS | | | | ERROR CODE | SELECTED DATA MEMORY |

F I G. 13

ELECTRONIC CONTROL UNIT

This application is related to application Ser. No. 10/788,370, filed on Mar. 1, 2004 commonly assigned with the present invention.

BACKGROUND OF THE INVENTION

1. Field of the Invention

The present invention relates to an on-vehicle electronic control unit having a microprocessor built-in for use in, for example, a fuel supply control of an automobile engine and, more particularly, to an improvement of an electronic control unit that includes a plurality of control circuit sections electrically divided so as to carry out a mutual communication of serial signals.

2. Description of the Related Art

Electronic control unit in which information exchange by a method of serial communication is carried out among a plurality of microprocessors sharing functions, and communication error is detected to carry out error processing, has been practically and widely used in various fields.

For example, according to the Japanese Patent Publication (unexamined) No. 108835/2002, the following "On-Vehicle Electronic Control Unit" is proposed. This on-vehicle electronic control unit comprises serial communication means that is constituted of a main CPU and a sub CPU, and is capable of transferring a control constant at the time of start of operation and mutually communicating a variety of data during the operation freely. Further disclosed in this on-vehicle electronic control unit are means for sum check error and retransmission processing relative to serial communication data, means for timeout check error and reset processing of microprocessor, or means for inhibition processing of control output.

According to the Japanese Patent Publication (unexamined) No. 333901/2002, another "On-Vehicle Electronic Control Unit" is proposed. This on-vehicle electronic control unit comprises serial communication means that is constituted of an integrated circuit section having a microprocessor and a communication control circuit, and is capable of transferring a control constant at the time of start of operation and mutually communicating a variety of data during the operation. In this on-vehicle electronic control unit, an example of a communication packet arrangement is described in detail.

On the other hand, according to the Japanese Patent Publication (unexamined) No. 162814/1997, the following "Communication Monitoring Unit" has been proposed. This communication monitoring unit comprises a communication control section that controls data communication and outputs an error notification signal upon detecting any communication error, an error counter that counts up in response to the input of the above-mentioned error notification signal, and an annunciation section that announces a communication error in response to the fact that a count value of this error counter has reached a plus predetermined value (threshold). In this communication-monitoring unit, there is provided counter subtraction means that counts down a count value of the above-mentioned error counter upon the fact that the control of data communication is normally carried out in the above-mentioned communication control section. Further it is arranged so as to prevent an alarm generation in vain with respect to a sporadic and chronic error in which an error state automatically recovers, while immediately making an annunciation with respect to a fatal and continuous failure.

Further, according to the Japanese Patent Publication (unexamined) No. 267948/2000, the following "Electronic Apparatus and Control Method of the Electronic Apparatus, and Recording Medium Recording a Controlling Software of the Electronic Apparatus" is proposed. This electronic apparatus comprises a first unit having a first computer and a second unit that includes a second computer, and is constructed detachably with respect to the above-mentioned first unit. In this electronic apparatus, the above-mentioned first computer comprises means for transmitting an operation confirmation signal in order to confirm the operation of the above-mentioned second computer to the above-mentioned second computer at intervals of a predetermined time period; and the above-mentioned second computer comprises means for replying an in-operation signal indicating a normal operation in response to the above-mentioned confirmation signal at the time of normal operation. Further, the above-mentioned first computer comprises means for resetting the above-mentioned second computer in the case where the above-mentioned in-operation signal is not replied within a predetermined standby time period to the transmission of the above-mentioned operation confirmation signal, and reliably resets the second computer when the second unit is mounted.

As for the rest, in association with this invention, according to the Japanese Patent Publication (unexamined) No. 235598/2002, the following "Vehicle Control Unit" is proposed. This vehicle control unit includes error occurrence storage means for restarting a microprocessor after having assured safety when the microprocessor such as main CPU or sub CPU, which is contained in any on-vehicle electronic device, runs away. However, the one that is described in this publication does not relate to a communication control.

According to the Japanese Patent Publication (unexamined) No. 108835/2002, five types of packets of A•control constant transmission, B•transmission of regular data, C•transmission of irregular data, D•transmission of readout request command, E•transmission of required data, are applied as downstream communication from a main CPU to a sub CPU.

Likewise, as upstream communication, all the communication packets of B–E, except for A•control constant transmission, are applied on an equal basis.

Furthermore, a receiving confirmation reply or a retransmission request can be made with respect to each of the upstream and downstream communications, so that an extremely high degree of freedom is achieved. A problem, however, exists in that a communication jam-up takes place at the time of occurrence of some sort of communication error making it incapable to carry out transmitting and receiving an essentially required data.

According to the Japanese Patent Publication (unexamined) No. 333901/2002, types of a communication packet is enormously reduced. In this control unit, 5 types of communication packets of A•control constant transmission, B•whole input readout request, C•whole output transmission, D•specific input readout request specifying an address, E•specific output transmission specifying an address as a downstream communication, are applied from a master station to a sub station; while no spontaneous upstream communication packet from the sub station to the master station is prepared.

Accordingly, reporting from the sub station cannot be carried out without request from the master station, and therefore a regular request comes to be necessary in the case of presence of any regular report data, eventually resulting in a problem that unnecessary downstream communication takes place.

According to the Japanese Patent Publication (unexamined) No. 162814/1997, there remain the following problems. That is, a problem exists in that in case of setting a threshold for determining an error to a large value, any response delay is generated in detection of error occurrence subsequent to a normal communication. On the other hand, in case of setting a threshold for determining an error to a small value, too-sensitive error detection is carried out even when any slight and sporadic error occurs.

Moreover, response to a variety of numerous communication errors and processing of timeout error or retransmission are not described from a comprehensive viewpoint.

According to the Japanese Patent Publication (unexamined) No. 267948/2000, a problem exists in that a computer is reset only with a single timeout. A further problem exists in that processing of sum check error or retransmission is not described from a comprehensive viewpoint.

According to the Japanese Patent Publication (unexamined) No.235598/2002, a problem exists in that although timeout of communication can be detected by monitoring the run-away of microprocessor, communication error in terms of lack or mix in bit such as sum check error is not monitored.

SUMMARY OF THE INVENTION

Accordingly, a first object of the present invention is to provide an electronic control unit that includes first and second control circuit sections electrically divided so as to perform mutual communication of serial signals, the electronic control unit being arranged such that a regular transmission from the first control circuit section acting as a master station to the second control circuit section acting as a sub station, and a regular report from the sub station to the master station can be carried out as required; and furthermore confirmation of presence or absence of any communication error relative to various communication packets, and a retransmission processing can be easily carried out while preventing communication jam-up.

A second object of this invention is to provide an electronic control unit that is capable of preventing too sensitive error determination with respect to a sporadic and chronic error in which communication error state automatically recovers; and is capable of comprehensively determining number of times of retransmission processing and an error definition timing with respect to a variety of communication errors such as sum check error or timeout error relative to various communication packets.

To accomplish the foregoing objects, according to the first aspect of the invention, an electronic control unit includes:

a first control circuit section containing a program memory, an operation processing RAM memory, a microprocessor, and a first series-parallel converter; and a second control circuit section containing a communication control circuit section at least for carrying out communication of monitoring and control signals, a data memory, and a second series-parallel converter; and in which serial communication of monitoring and control signals is carried out mutually between the mentioned first and second control circuit sections via the mentioned first and second series-parallel converters.

In this electronic control unit, the mentioned first control circuit section includes regular transmission means and irregular transmission means, and the mentioned second control circuit section includes regular report means and an unprocessed data table.

The mentioned regular transmission means acts as write setting means that regularly transmits a control output data or a constant set data from the mentioned first control circuit section to the mentioned second control circuit section, and executes a retransmission processing from the first control circuit section to the second control circuit section in the case of presence of any communication error in confirmation reply of whether or not the second control circuit section has received the mentioned regular transmission data. The mentioned regular report means acts as one-way input readout means which regularly reports a monitoring input data and status information from the mentioned second control circuit section to the mentioned first control circuit section, whereby no confirmation reply of whether or not the first control circuit section has received the mentioned regular report data is carried out.

The mentioned irregular transmission means acts as transmission means that is applicable when any error is present in a report communication provided by the mentioned regular report means, and is also applied when required as to a readout request for a monitoring input data of a specified address from the mentioned first control circuit section to the mentioned second control circuit section, and a readout request for reading out and checking a write save data having been written and set by the mentioned regular transmission means.

Furthermore, the mentioned irregular transmission means acts as readout request means that makes a readout request again from the first control circuit section to the second control circuit section in the case of presence of any communication error in a report reply of a monitoring input data of a specified address or a write save data, the mentioned report reply being carried out as a confirmation reply to the fact that the mentioned second control circuit section has received the mentioned irregular transmission data.

The mentioned unprocessed data table acts as a receiving-side command memory arranged so as to sequentially save a command data for executing a confirmation reply when the mentioned second control circuit section receives any transmission data from the mentioned first control circuit section, and to sequentially erase the mentioned saved data when the mentioned second control circuit section transmits the confirmation reply data to the mentioned first control circuit section.

The transmission of a regular report data can be carried out while preventing upstream communication jam-up from the mentioned second control circuit section to the mentioned first control circuit section with the mentioned unprocessed data table.

According to the second aspect of the invention, an electronic control unit includes:

a first control circuit section containing a program memory, an operation processing RAM memory, a microprocessor, and a first series-parallel converter; and a second control circuit section containing a communication control circuit section at least for carrying out communication of monitoring and control signals, a data memory, and a second series-parallel converter; and in which serial communication of monitoring and control signals is carried out mutually between the mentioned first and second control circuit sections via the mentioned first and second series-parallel converters.

In this electronic control unit, the mentioned first control circuit section includes regular transmission means and irregular transmission means, and the mentioned second control circuit section includes regular report means and an unprocessed data table.

Further, the mentioned first and second control circuit sections include first and second communication error determination means, first and second adding-subtracting means, and first and second error occurrence definition means respectively, and the mentioned first control circuit section includes retransmission means.

The mentioned regular transmission means acts as write setting means that regularly transmits a control output data or a constant set data from the mentioned first control circuit section to the mentioned second control circuit section, and executes retransmission processing from the first control circuit section to the second control circuit section in the case of presence of any communication error in confirmation reply of whether or not the second control circuit section has received the mentioned regular transmission data.

The mentioned regular report means acts as one-way input readout means which regularly reports a monitoring input data and status information from the mentioned second control circuit section to the mentioned first control circuit section, whereby no confirmation reply of whether or not the first control circuit section has received the mentioned regular report data is carried out.

The mentioned irregular transmission means acts as transmission means that is applicable when any error is present in a report communication provided by the mentioned regular report means, and is also applied when required as to a readout request for a monitoring input data of a specified address from the mentioned first control circuit section to the mentioned second control circuit section, and a readout request for reading out and checking a write save data having been written and set by the mentioned regular transmission means.

The mentioned irregular transmission means acts as readout request means that makes a readout request again from the first control circuit section to the second control circuit section in the case of presence of any communication error in a report reply of a monitoring input data of a specified address or a write save data, the mentioned report reply being carried out as a confirmation reply to the fact that the mentioned second control circuit section has received the mentioned irregular transmission data.

The mentioned first and second communication error determination means act as plural types of receiving error determination means that determine presence of absence of any error regarding various regular and irregular communication packets that a control circuit section on the side where the mentioned determination means is provided has received from the other control circuit section, or that discriminate a state that any communication packet to be received cannot be received.

The mentioned first and second adding-subtracting means act as operation means that adds or subtracts a second variation value when any of the mentioned plural types of receiving error determination means determines the presence of error, and subtracts or adds a first variation value when all the receiving error determination means determine the absence of any error to perform an addition-subtraction compensation with respect to a current value memory so as to offset each other, and stops an addition-subtraction compensation with the mentioned first variation value at a predetermined normal-side limit value when the determination of the absence of error continues.

The mentioned first and second error occurrence definition means act as comparison means that generates an error detection signal when a current value of the mentioned adding-subtracting means gets out of a scope of a predetermined abnormal-side limit value as a result of accumulation of the mentioned first and second variation values.

The mentioned retransmission means is means, which operates when any error is present in a transmission data provided from the mentioned first control circuit section to the mentioned second control circuit section, or when error is present in a confirmation reply data in response to the mentioned transmission data, and with which the first control circuit section transmits again a communication packet corresponding to the old transmission command, and adds or subtracts a second variation value with respect to mentioned first adding-subtracting means.

The mentioned second variation value is set to a value smaller than a permitted accumulation value, being a difference between the mentioned abnormal-side limit value and normal-side limit value, and stopping the operation, or initialization and restart of the mentioned first or second control circuit section is carried out responsive to the occurrence of the mentioned error detection signal.

In the electronic control unit of the invention of above arrangement, although the confirmation reply to a regular report provided by regular report means is not carried out, it is possible to reconfirm a regular report content with irregular transmission means at the time of detecting a communication error relative to a regular report data, and it is possible to make a readout request as needed with the irregular transmission means as to a write save data having been written and set by the regular transmission means to confirm a content thereof.

As a result, an advantage is exhibited in that it is possible to omit any report direction or confirmation reply to a regular report each time, and it is possible to reduce an amount of a downstream communication thereby diminishing a burden of communication control.

A further advantage is exhibited in that the regular transmission or the regular report can be carried out on a timely basis while preventing jam-up of an upstream communication from the second control circuit section to the first control circuit section with the unprocessed data table.

In the electronic control unit according to claim 2 of the invention, as defined in claim 1, the first control circuit section includes a reply-waiting data table and retransmission means. As a result, an advantage is exhibited in that it is easy to discriminate whether or not the confirmation reply is present, and it is possible to easily decide a command to be retransmitted and processed at the time of occurrence of any communication error.

In the electronic control unit according to claim 3 of the invention, as defined in claim 1 or 2, the second control circuit section includes readout request setting means. As a result, the second control circuit section not merely carries out the regular report, but a content of a selected data memory can be immediately read out as the need arises. In consequence, an advantage is exhibited in that it is possible to immediately report error information other than a communication error to the first control circuit section while reducing an amount of a regular report data.

In the electronic control unit according to claim 4 of the invention, as defined in claim 1, at least one of regular transmission means of regular report means includes division circulating means. As a result, data are sequentially divided and transmitted, or divided and reported in a cycle corresponding to a required emergency degree, thereby enabling to suppress a data amount to be transmitted or reported at a single communication to prevent jam-up of communication.

In the electronic control unit according to claim 5 of the invention, as defined in claim 1, the first control circuit section includes regular report permission means. As a result, when a large number of initialization set data and the like are transmitted from the first control circuit section to the second control circuit section at the time of start of operation, the regular report from the second control circuit section is inhibited thereby resulting in an advantage that jam-up of communication is prevented.

An electronic control unit according to claim 6 of the invention is constituted of first and second control circuit sections mutually carrying out a serial communication of monitoring and control signals via first and second series-parallel converters. In this electronic control unit, the first and second control circuit sections include first and second communication error determination means, first and second adding-subtracting means, and first and second error occurrence definition means respectively; and in which the first control circuit section includes retransmission means; and a variety of communication errors are collected and counted at the first or second adding-subtracting means, and a retransmission processing can be executed until a current value of the adding-subtracting means reaches an abnormal-side limit value.

As a result, an advantage is exhibited in that a too sensitive error determination is not carried out in the case of a sporadic and chronic error; and the error determination is made based on the fact that a current value of the first adding-subtracting means gets out of the scope of an abnormal-side limit value, and the initialization and restart are carried out in the case where a communication error still occurs even if the retransmission processing continues. Consequently, an advantage is exhibited in that it is possible to rationally regulate the permitted number of times of retransmission processing depending on a past history of whether or not the normal communication has continued.

In the electronic control unit according to claim 7 of the invention, as defined in claim 6, the first and second control circuit sections include first and second initialization means.

As a result, it is possible to initialize a control circuit section on the other side without depending on a communication line where any error occurs. Since a current value of the adding-subtracting means is made closer to an abnormal-side limit value at the time of restart, an advantage is exhibited in that safety shortly after the start can be improved.

In the electronic control unit according to claim 8 of the invention, as defined in claim 6 or 7, the mentioned first and second communication error determination means include at least one of bit information monitoring means and reply delay monitoring means or receiving interval monitoring means; and in which adding-subtracting means performs an addition-subtraction compensation with a first variation value when none of the bit information monitoring means, reply delay monitoring means, and receiving interval monitoring means makes any error determination.

As a result, an advantage exists in that a variety of determinations of a communication error enable improvement in detection accuracy and an early detection of the communication error; and that a highly accurate error determination can be carried out due to the fact that definition of any error occurrence is carried out with data collected at a pair of adding-subtracting means.

In the electronic control unit according to claim 9 of the invention, as defined in claim 8, a second variation value, which an adding-subtracting means adds or subtracts when the determination of bit information monitoring means is any communication error, is a value larger than a first variation value; and a variation value, which the adding-subtracting means adds or subtracts when the determination of reply delay monitoring means or receiving interval monitoring means is any communication error, is a third variation value, being a value different from a second variation value; and further, the mentioned third variation value is also a value smaller than a permitted accumulation value, being a difference between an abnormal-side limit value and normal-side limit value.

As a result, it is possible to make an error determination with weighting a variety of determinations of a communication error. Furthermore, it is unnecessary to set an excessive float as a determination threshold value for a timeout error such as reply delay or receiving interval excess, and it is possible to set a determination time period appropriate for a raw power. Consequently, an advantage is exhibited in that a highly accurate timeout determination can be carried out.

In the electronic control unit according to claim 10 of the invention, as defined in claim 8 or 9, the first control circuit section includes a reply-waiting data table; and in which the mentioned reply-waiting data table acts as reply error determination means for making an error determination when a save time period of a leading data remained in a transmission-side command memory, being mentioned reply-waiting data table exceeds a predetermined value, and a command data determined to be a reply error and a command data having a confirmation reply of a receiving failure are sequentially deleted from the mentioned transmission-side command memory, and stored anew in the transmission-side command memory at the time of being transmitted again.

As a result, an advantage is exhibited in that the determination of whether the reply delay or the receiving failure is present or absent is easily made, and that a command to be retransmitted and processed when the error determination is made can be easily decided.

In the electronic control unit according to claim 11 of the invention, as defined in any one of claims 6 through 10, the first control circuit section includes a first set data memory; and in which a part or all of various control constants are transferred and written from a non-volatile program memory cooperating with a microprocessor.

As a result, an advantage is exhibited in that it is possible to change a variety of control constants in accordance with an operation environment, and easily optimize the conditions for deciding the error occurrence.

In the electronic control unit according to claim 12 of the invention, as defined in any one of claims 6 through 11, the second control circuit section includes a second set data memory; and in which a part or all of various control constants are transmitted and written from a non-volatile program memory cooperating with a microprocessor via the first and second series-parallel converters.

As a result, an advantage is exhibited in that it is possible to change a variety of control constants in accordance with an operation environment, and easily optimize conditions for deciding the error occurrence. A further advantage is exhibited in that it is possible to set conditions for deciding the error occurrence in the first and second control circuit sections as different conditions, thereby enabling to carry out various error determinations.

In the electronic control unit according to claim 13 of the invention, as defined in any one of claims 6 through 12, the second control circuit section includes regular report means and current value report means.

As a result, an advantage is exhibited in that it is possible for the first control circuit section to monitor in a comprehensive manner a current value of the first and second adding-subtracting means. A further advantage is exhibited in that it is possible for the first control circuit section to immediately detect error with status information in the case of occurring any receiving interval error of the second control circuit section responsive to the regular transmission.

In the electronic control unit according to claim 14 of the invention, as defined in any one of claims 6 through 13, there are provided a direct input/output signal interface circuit, a watchdog timer, and error occurrence storage means. The error occurrence storage means acts as error storage circuit that stores first and second error detection signals or a reset pulse signal to bring annunciation means such as alarm, display, printing, and history save when the mentioned error detection signals are generated and when the reset pulse signal provided by the watchdog timer is generated; and the main CPU is initialized and restarted when the watchdog timer generates a reset pulse signal and when the second error detection signal is generated. A communication control circuit section of the second control circuit section is initialized and restarted when the watchdog timer generates a reset pulse signal and when the first error detection signal is generated.

As a result, an advantage is exhibited in that it is possible to restart the main CPU without depending on a communication line where the error occurs. Furthermore, while an error detection signal regarding communication is generated due to plural times of communication errors, the occurrence of any watchdog timer error immediately causes the error storage or restart to be carried out. In consequence, a further advantage is exhibited in that it is possible to change weighting with respect to the error processing, and announce the error.

Furthermore, even in the case where the error is a temporary noise malfunction of the main CPU, and the main CPU is immediately restarted in a normal way, the fact that the error occurs is well marked. In consequence, a further advantage is exhibited in that it is possible to induce a maintenance inspection.

In the electronic control unit according to claim 15 of the invention, as defined in claim 14, there are provided an auxiliary CPU, and run-away monitoring means with respect to this auxiliary CPU; and the auxiliary CPU is initialized and restarted, and an error storage circuit stores an error occurrence when the mentioned run-away monitoring means generates a reset pulse signal, when the watchdog timer generates a reset pulse signal, and when a first error detection signal is generated.

As a result, an advantage is exhibited in that it is possible to restart the auxiliary CPU without depending on a communication line where any error occurs. A further advantage is exhibited in that it is possible to change the weighting of the error processing in response to the occurrence of a communication error and the occurrence of a run-away error provided by the run-away monitoring means, and announce the errors.

Furthermore, even in the case where the error is a temporary noise malfunction of the auxiliary CPU, and the auxiliary CPU is immediately restarted in a normal way, the fact that the error occurs is well marked. In consequence, advantageously it is possible to induce a maintenance inspection.

In the electronic control unit according to claim 16 of the invention, as defined in claim 14 or 15, error occurrence storage means is constituted of a count storage circuit; and the mentioned count storage circuit counts an OR output with respect to first and second error detection signals and a reset pulse signal provided by the watchdog timer or the run-away monitoring means, and brings the mentioned annunciation means in operation when the mentioned count value reaches a predetermined value.

As a result, an advantage is exhibited in that it is possible to set a determination threshold value of the watchdog timer at a strict value matching a raw power cycle of a watchdog timer clear signal, and make an accurate run-away determination; and it is possible to prevent the error alarm from being carried out in vain.

Further, since there is provided the OR means, there is an advantage that communication errors attributed to the run-away error are not counted redundantly.

In the electronic control unit according to claim 17 of the invention, as defined in claim 14 or 15, at least one of the first and second control circuit sections includes driving stop means and clear means.

As a result, an advantage is exhibited in that even in the case where an error is a temporary noise malfunction and the electronic control unit is immediately restarted in a normal way, driving the specified electrical loads having a negative affect on safety is stopped thereby improving the safety. A further advantage is exhibited in that it is possible to cause the electronic control unit to return to the normal operation state by manual operation.

In the electronic control unit according to claim 18 of the invention, as defined in claim 16, at least one of the first and second control circuit sections includes driving stop means and clear means. As a result, even in the case where an error is a temporary noise malfunction and the electronic control unit is immediately restarted in a normal way, driving the specified electrical loads having a negative affect on safety is stopped thereby improving the safety. A further advantage is exhibited in that it is possible to cause the electronic control unit to return to the normal operation state by manual operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram showing a control output and constant set data table in the electronic control unit according to the second embodiment.

FIG. 13 is a diagram showing a monitoring input data table in the electronic control unit according to the second embodiment.

DESCRIPTION OF THE PREFERRED EMBODIMENTS

Figure 1:
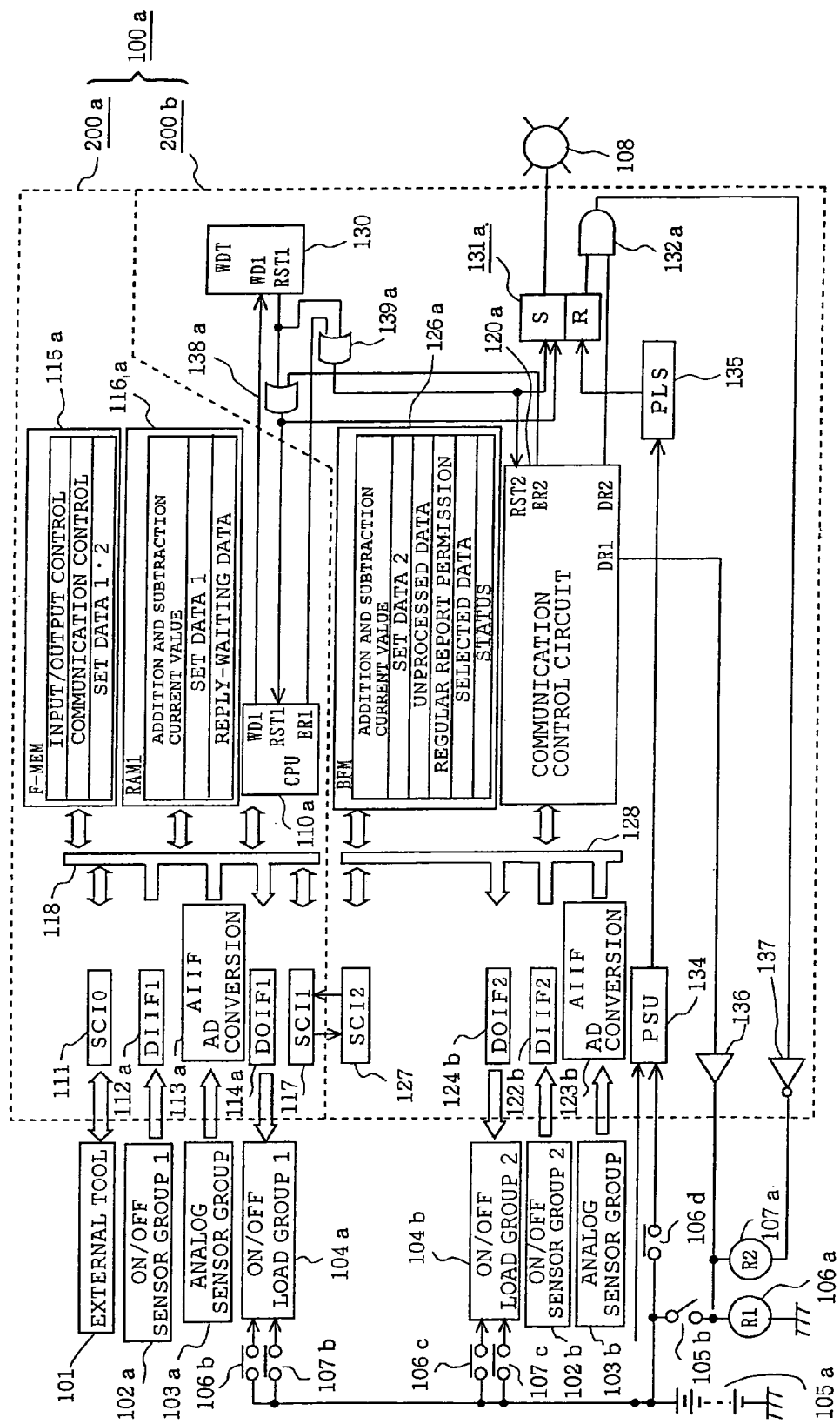
FIG. 1 is a block diagram showing an entire constitution of an electronic control unit according to a first preferred embodiment.

Several preferred embodiments according to the present invention are described referring to the drawings.

In the drawings, like reference numerals designate the same or like parts.

Embodiment 1.

FIG. 1 is a block diagram showing an entire constitution of an electronic control unit according to a first embodiment.

With reference to FIG. 1, reference numeral 100a designates an electronic control unit consisting of a first control circuit section 200a and a second control circuit section 200b.

First, as a component connected to the outside of the above-mentioned electronic control unit 100a, numeral 101 designates an external tool. This external tool 101 is connected via a detachable connector, not shown, to the above-mentioned electronic control unit 100a at the time of dispatching a product or maintenance inspection thereof, and functions to transfer and write a control program or a control constant to the later-described non-volatile program memory 115a.

Numeral 102a designates a first input sensor group (for example, an engine speed sensor, a crank angle sensor, and a speed sensor) that performs an ON/OFF operation. This first input sensor group 102a performs a relatively high-speed and high-frequency operation, and serves as a sensor group the input of which needs to be directly fetched into the later-described main CPU 110a.

Numeral 102b designates a second input sensor group that performs an ON/OFF operation (for example, a selected position sensor of a transmission shift lever, an air-conditioner switch, an idle-position detecting switch of an accelerator pedal, a power steering operation switch, and a break switch). This second input sensor group 102b performs a relatively low-frequency operation, and serves as a sensor group in which delay in fetching signals does not matter much.

Numeral 103a designates a first analog sensor group (for example, an air flow sensor measuring an air-intake of a throttle, an accelerator position sensor measuring a depression degree of the accelerator pedal, and a throttle position sensor measuring an opening of a throttle valve). This first analog sensor group 103a performs an output change the degree of which is relatively sharp, and serves as a sensor group the signals of which need to be directly fetched into the later-described main CPU 110a.

Numeral 103b designates a second analog sensor group (for example, a coolant temperature sensor, an intake-air temperature, and an atmospheric pressure sensor). This second analog sensor group 103b performs a relatively slow output change, and serves as a sensor group in which delay in fetching signals does not matter much.

Numeral 104a designates a first electrical load group (for example, a fuel injection solenoid valve, an ignition coil, and an open/close controlling motor of an intake-air throttle) This first electrical load group 104b performs a relatively high-frequency operation, and serves as an electrical load group of an ON/OFF operation that needs to generate a drive output without delay.

Numeral 104b designates a second electrical load group (for example, an air-conditioner driving electromagnetic clutch or a transmission stage shifting solenoid valve of the transmission). This second electrical load group 104b performs a relatively low-frequency operation, and serves as an electrical load group of an ON/OFF operation in which response delay in drive output does not matter much.

Numeral 105a designates an external power supply feeding an electric power to the above-mentioned electronic control unit 100a or the first and second electrical load groups 104a and 104b. Numeral 105b designates a power supply switch. Numeral 106a designates a power supply relay including output contacts 106b, 106c and 106d. Numeral 107a designates a load power supply relay including output contacts 107b and 107c. The above-mentioned power supply relay 106a is energized from the above-mentioned external power supply 105a via the above-mentioned power supply switch 105b, and closes a power supply circuit to the above-mentioned first and second electrical load groups 104a and 104b with the output contacts 106b and 106c. Further, the above-mentioned power supply relay 106a closes a power feed circuit from the above-mentioned external power supply 105a to the electronic control unit 100a with the output contact 106d.

Furthermore, the above-mentioned external power supply 105a and electronic control unit 100a includes a direct connection circuit so that the electromagnetic control unit 100a may be fed with an electric power in sleep mode even when the above-mentioned power supply switch 105b is open.

In this respect, even in the state that the operation of the microprocessor is stopped and the electromagnetic control unit is not operated, feeding a small amount of electric power continues in order to maintain a part (or all) of a storage state of the later-described RAM memory 116a. Such a power feed state is referred to as power feed in sleep mode.

Further, a part of the above-mentioned first and second electrical load groups 104a and 104b are arranged so that a power supply circuit may be closed via the output contacts 107b and 107c of the above-mentioned load power supply relay 107a.

Numeral 108 designates an alarm and display (annunciation means), which is driven from the above-mentioned electronic control unit 100*a* and mounted at such a position where any observer can easily watch.

Now, internal constitution of the first control circuit section 200*a* is described.

Numeral 110*a* designates a main CPU, being a microprocessor, for example, of 32 bits. Numeral 111 designates a serial interface that is serially connected to the above-mentioned external tool 101. Numeral 112*a* designates a direct input signal interface circuit that is connected in parallel to the above-mentioned first input sensor group 102*a*. Numeral 113*a* designates a first multi-channel AD converter that is connected to the above-mentioned first analog sensor group 103*a*. Numeral 114*a* designates a direct output signal interface circuit that is connected in parallel to the above-mentioned first electrical load group 104*a*. Numeral 115*a* designates a non-volatile program memory such as flash memory. Numeral 116*a* designates a RAM memory for operation processing. Numeral 117 designates a first series-parallel converter that is provided in the first control circuit section 200*a*. Numeral 118 designates a data bus.

The above-mentioned serial interface 111, first series-parallel converter 117, first multi-channel AD converter 113*a*, direct input signal interface circuit 112*a*, direct output signal interface circuit 114*a*, program memory 115*a*, RAM memory 116*a* and main CPU 110*a* are mutually connected through the above-mentioned data bus 118. The one that is specified by means of an address bus or a chip select circuit, not shown, communicates with the above-mentioned CPU 110*a*.

Furthermore, written in the above-mentioned program memory 115*a* are a program acting as input/output control means or a program acting as communication control means, and a set data to be transferred and written in the later-described first and second set data memories 237*a* and 237*b* (refer to FIG. 2).

Additionally, in the above-mentioned RAM memory 116*a*, written are a current value data of the later-described first adding-subtracting means 230*a* (refer to FIG. 2), a fist set data having been transferred from the above-mentioned program memory 115*a*, or the later-described reply waiting command data.

Now, internal constitution of the second control circuit section 200*b* is described.

Numeral 120*a* describes an associative control circuit section the main component of which is the later-described communication control circuit section (it is also referred to as communication control circuit section). Numeral 122*b* designates an indirect input signal interface circuit that is connected in parallel to the above-mentioned second input sensor group 102*b*. Numeral 123*b* designates a second multi-channel AD converter that is connected to the above-mentioned second analog sensor group 103*b*. Numeral 124*b* designates an indirect output signal interface circuit that is connected in parallel to the above-mentioned second electrical load group 104*b*. Numeral 126*b* designates a data memory to be connected to the later-described data bus 128 with a chip select signal not shown. Numeral 127 designates a second series-parallel converter that is serially connected to the above-mentioned series-parallel converter 117 provided in the first control circuit section 200*a*. Numeral 128 designates a data bus.

The above-mentioned second series-parallel converter 127, indirect input signal interface circuit 122*b*, indirect output signal interface circuit 124*b*, second multi-channel AD converter 123*b*, data memory 126*a* and associative control circuit section 120*a* are mutually connected through the above-mentioned data bus 128.

Herein, the indirect input signal or the indirect output signal is an input/output signal to be communicated with the microprocessor 110*a* acting as a main CPU or a microprocessor 110*b* to be described later in a second embodiment by a serial communication via the first series-parallel converter 117 and the second series-parallel converter 127. Whereas, the direct input signal or the direct output signal is an input/output signal to be directly connected to the microprocessor 110*a* acting as a main CPU or the microprocessor 10*b* without the first series-parallel converter 117 and the second series-parallel converter 127.

In addition, the electronic control unit according to this first embodiment is constituted so as to divide into two parts of the first control circuit section 200*a* and the second control circuit section 200*b* via a serial communication section (first and second series-parallel converters). Further, the first control circuit section 200*a* uses the second control circuit section 200*b* in combination, and there is provided the associative control circuit section 120*a* as a central part of the second control circuit section 200*b* to be used in combination.

The main component of the associative control circuit section 120*a* is a communication control circuit so that numeral 120*a* is hereinafter referred to as a communication control circuit section.

Further, written in the above-mentioned data memory 126*a* are a current value data of the later-described second adding-subtracting means 230*b* (refer to FIG. 2), a second set data having been transferred from the above-mentioned program memory 115*a*, or the later-described unprocessed command data, as well as a regular report permission command data, a selected data, a status information and the like.

Numeral 130 designates a watchdog timer. This watchdog timer 130 monitors a watchdog clear signal WD1, being a pulse train that the above-mentioned main CPU of the first control circuit section 200*a* generates, and generates a re-set pulse signal RST1 to cause the above-mentioned main CPU 110*a* to restart when a pulse width of the foregoing watchdog clear signal WD1 exceeds a predetermined value.

Further, the above-mentioned main CPU 110*a* generates the later-described first error detection signal ER1.

In addition, the above-mentioned communication control circuit section (associative control circuit section) 120*a* generates the later-described second error detection signal ER2, or a drive output DR1 to the above-mentioned power supply relay 106*a* and a drive output DR2 to the above-mentioned load power supply relay 107*a*.

Numeral 131*a* designates an error storage circuit (error occurrence storage means) constituted of a flip-flop circuit that includes a set input S and a reset input R. This error storage circuit (error occurrence storage means) 131*a* stores the operation of the above-mentioned reset pulse signal RST1 or first and second error detection signals ER1 and ER2, and drives the above-mentioned alarm and display (annunciation means) 108.

Numeral 132*a* designates a gate circuit (drive stop means) Numeral 134 designates a power supply unit. Numeral 135 designates a power supply detection circuit. Numeral 136 designates a drive element. Numeral 137 designates an inverting drive element. The above-mentioned power supply unit 134 is directly fed with an electric power from the above-mentioned external power supply 105*a* or fed with power via the output contact 106*d* of the above-mentioned power supply relay 106*a*, and generates a stabilizing control power supply output to be used in the above-mentioned electronic control unit 10*a*.

Further, the above-mentioned power supply detection circuit 135 detects the fact that the above-mentioned power supply switch 105*b* is closed, and resets the above-mentioned error storage circuit (error occurrence storage means) 131*a* to initialize it.

The above-mentioned drive element 136 drives the above-mentioned power supply relay 106*a* with the above-mentioned drive output DR1, and continues to hold the operation of the power supply relay 106*a* until the drive output DR1 is stopped outputting even if the above-mentioned power supply switch 105*b* is closed.

The above-mentioned inverting drive element 137 drives the above-mentioned load power supply relay 107*a* from the terminal of the above-mentioned drive output DR2 via the above-mentioned drive stop means 132*a*. Further, the foregoing load power supply relay 107*a* operates when the drive output DR2 is generated and the error storage circuit 131*a* stores no error.

In addition, it is arranged such that the above-mentioned load power supply relay 107*a* is de-energized upon de-energization of the above-mentioned power supply relay 106*a*; while only the load power supply relay 107*a* is de-energized even if the power-supply relay 106*a* is energized, thereby enabling to stop the power feed with respect to a part of electrical loads.

Numeral 138*a* designates an OR element the inputs of which are the above-mentioned reset pulse signal RST1 and second error detection signal ER2. The outputs from the foregoing OR element 138*a* are connected to a reset input terminal RST1 of the above-mentioned main CPU 110*a* and a set input terminal of the above-mentioned error storage circuit 131*a*.

Numeral 139*a* designates an OR element the inputs of which are the above-mentioned reset pulse signal RST1 and first error detection signal ER1. The outputs from the foregoing OR element 139*a* are connected to a reset input terminal RST2 of the above-mentioned associative control circuit section 120*a* and a set input terminal of the above-mentioned error storage circuit 131*a*.

Now, operations of a communication control in the electronic control unit according to this first embodiment are described.

Figure 2:
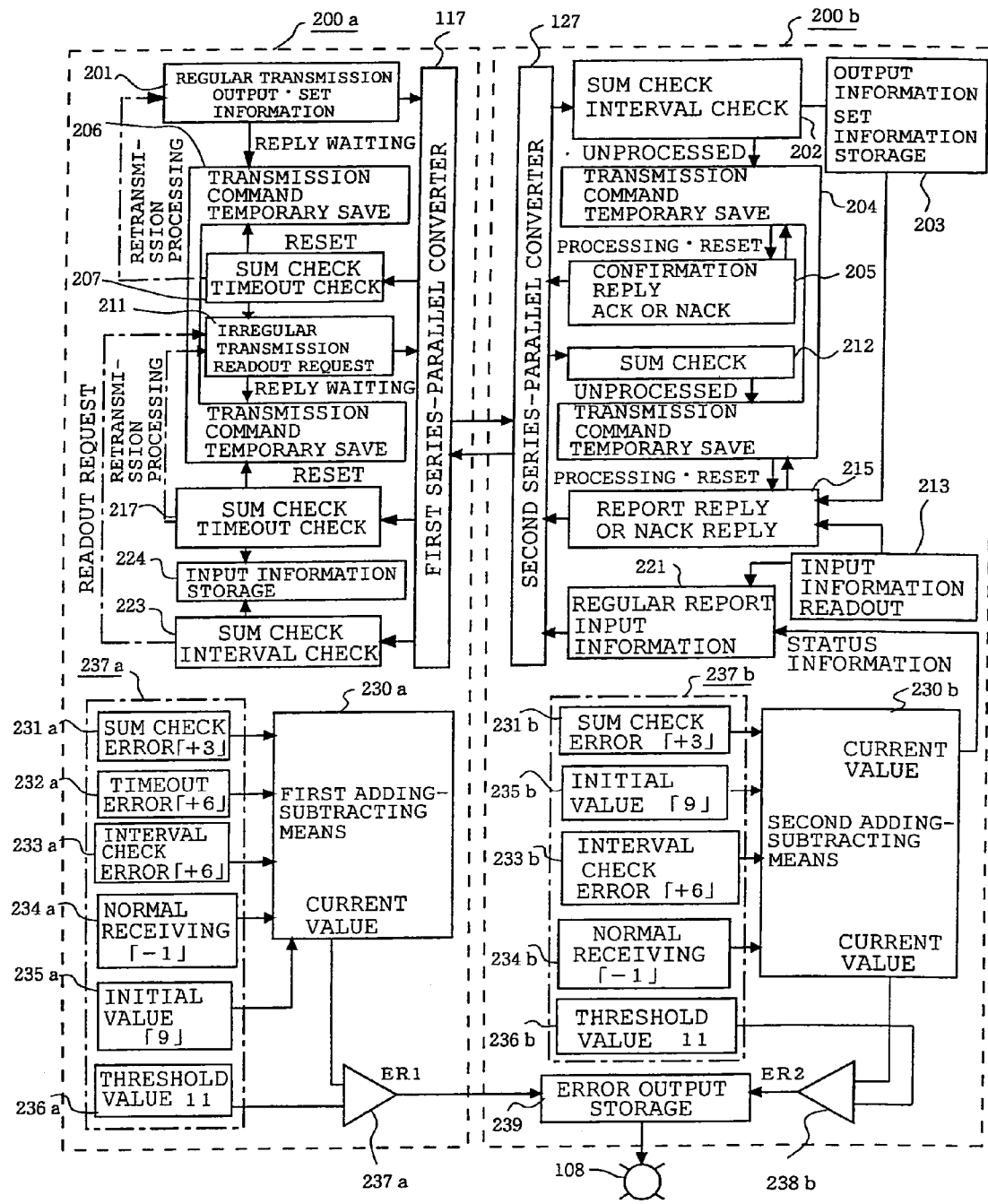
FIG. 2 is a block diagram for explaining a communication control operation of the electronic control unit according to the first embodiment.

FIG. 2 is a block diagram for explaining a communication control operation of the electronic control unit according to the first embodiment shown in FIG. 1.

With reference to FIG. 2, signals to be exchanged between the first control circuit section 200*a* including the first series-parallel converter 117 (hereinafter, also referred to as a master station) and the second control circuit section 200*b* including the second series-parallel converter 127 (hereinafter, also referred to as a sub station) are classified roughly as follows.

Numeral 201 designates a regular transmission packet that is prepared at the master station and transmitted to the sub station. Numeral 202 designates a determination block that is executed on the side of the sub station (second control circuit section 200*b*) having received the foregoing regular transmission packet 201 and acts as a part of second communication error determination means. Numeral 203 designates an output information storage block that stores a regular transmission data having been normally received via the foregoing determination block 202. Numeral 204 designates an unprocessed data table that sequentially stores a normal receiving ACK or a receiving failure NACK as a reply command data responsive to the transmission from the master station to the substation. Numeral 205 designates a confirmation reply packet to be replied from the sub station to the master station.

The above-mentioned confirmation reply packet 205 corresponds to a leading reply command data having been stored at the earliest time and remained in the above-mentioned unprocessed data table 204. A leading reply command data in the above-mentioned unprocessed data table 204 is deleted, accompanied by the transmission of the confirmation reply packet 205.

In this respect, data to be transmitted with the above-mentioned regular transmission packet 201 include direct output information that is output to the second electrical load group 104*b* of FIG. 1, various set constants to be transmitted to the later-described second set data memory 237*b*, and the like.

Numeral 206 designates a reply waiting data table that sequentially stores transmission command data when the above-mentioned regular transmission packet 201 is transmitted on the master station side. Numeral 207 designates a determination block that is executed on the side of the master station (the first control circuit section 200*a*) having received a reply data from the sub station and acts as a part of first communication error determination means. When the foregoing determination block 207 determines that it is a normal receiving, a leading command data having been stored in the above-mentioned reply waiting data table 206 is deleted.

Further, when the above-mentioned determination block 207 normally receives the receiving failure data NACK or when the determination block 207 carries out the determination of the receiving error with respect to a reply data, a retransmission processing is carried out with the above-mentioned regular transmission packet 201. This retransmission processing causes an old saved data in the above-mentioned reply waiting data table 206 to be deleted and causes a transmission command data having been retransmitted is newly stored.

Numeral 211 designates an irregular transmission packet to be transmitted from the master station to the sub station when the master station executes a readout request to the sub station. Numeral 212 designates a determination block that is executed on the side of the sub station having received the foregoing irregular transmission packet 211 and acts as a part of second communication error determination means. In the above-mentioned unprocessed data table 204-, stored together with a replying command are the receiving failure NACK or an address of reply information necessary to be reported and replied as a determination result of the above-mentioned determination block 212.

Numeral 213 designates an input information readout block for reading out input information on the sub station side. Numeral 215 designates a report reply packet to be replied from the sub station to the master station.

The foregoing report reply packet 215 corresponds to a leading reply command data having been stored at the earliest time and remained in the above-mentioned unprocessed data table 204. The leading reply command data in the above-mentioned unprocessed data table 204 is deleted, accompanied by the transmission of the report reply packet 215.

In addition, a reply command data corresponding to the above-mentioned regular transmission packet 201 and a reply command data corresponding to the above-mentioned irregular transmission packet 211 are synthesized and stored in order of generation in the above-mentioned unprocessed data table 204. Further, replying these data are executed in sequence in which the older ones are fetched out first on the basis of first-in first-out.

Likewise, when the above-mentioned regular transmission packet 201 or irregular transmission packet 211 are transmitted, transmission command data are sequentially stored in the above-mentioned reply-waiting data table 206.

Numeral 217 designates a determination block that is executed on the master station side having received a reply data from the substation and acts as a part of first communication error determination means. When the foregoing determination block 217 determines the normal receiving, a leading command data, which is stored in the above-mentioned reply waiting data table 206, is deleted. In addition, input information relative to an address that is specified with the above-mentioned report reply packet 215 is stored and saved by the later-described input information storage block 224.

When the above-mentioned determination block 217 normally receives a receiving failure data NACK of the sub station side or the determination block 217 determines the receiving error relative to a reply data, the retransmission processing is carried out with the above-mentioned irregular transmission packet 211. Further, this retransmission processing causes an old saved data in the above-mentioned reply waiting data table 206 to be deleted and causes a transmission command data having been retransmitted to be newly stored.

Numeral 221 designates a regular report packet for the purpose of regularly transmitting input information on the sub station side to the master station. Numeral 223 designates a determination block that is executed on the master station side having received a regular report data from the sub station (specifically, data that is regularly transmitted from the sub station with a regular report packet 221) and acts as a part of first communication error determination means. Numeral 224 designates an input information storage block that stores the above-mentioned regular report data when the above-mentioned determination block 223 determines that it is a normal receiving.

Further, it is arranged such that when the above-mentioned determination block 223 determines the receiving error relative to a regular report data, a readout request can be made with the above-mentioned irregular transmission packet 211.

Furthermore, data to be transmitted with the above-mentioned regular report packet 221 or report reply packet 215 are indirect input signals provided by the second input sensor group 102$b$ or the second analog sensor group 103$b$ of FIG. 1. Additionally, in the case of the report reply packet 215, output and set information having been written and set already with a regular transmission packet 201 is also the target for replying.

First communication error determination means in the above-mentioned determination blocks 207, 217, 223 includes bit error determination means for determining the presence or absence of any lack and mix in bit information such as parity check or sum check relative to a serial data having been replied or reported from the sub station to the master station.

Further, the first communication error determination means in the above-mentioned determination blocks 207 and 217 includes reply response error determination means that carries out an error determination when a save time period of the oldest transmission command data remained in the above-mentioned reply waiting data table 206 exceeds a predetermined reply response time period.

In addition, the first communication error determination means in the above-mentioned determination block 223 includes receiving interval error determination means that carries out the error determination when a receiving interval time period of the master station with respect to a regular report data, which the sub station transmits, exceeds a predetermined value.

Likewise, second communication error determination means in the above-mentioned determination blocks 202 and 212 includes bit error determination means for determining the presence or absence of any lack and mix in bit information such as parity check or sum check with respect to a serial data having been transmitted from the master station to the sub station.

Further, the second communication error determination means in the above-mentioned determination block 202 includes receiving interval error determination means that carries out the error determination when a receiving interval time period of the sub station with respect to a regular transmission data, which the master station transmits, exceeds a predetermined value.

Numeral 230$a$ designates first adding-subtracting means, which is constituted of, for example, a reversible counter, and initial value of which is set to 9 and the current value of which is restricted so as not to be less than 0. Numeral 231$a$ designates a storage memory of a second variation value that acts when any bit error is determined in the above-mentioned determination blocks 207, 217 and 223, and adds a variation value 3 with respect to the above-mentioned first adding-subtracting means 230$a$.

Further, numeral 232$a$ designates a storage memory of a third variation value that acts when a reply response error determination is made in the above-mentioned determination blocks 207 and 217, and adds a variation value 6 with respect to the above-mentioned first adding-subtracting means 230$a$. Numeral 233$a$ designates a storage memory of a third variation value that acts when a receiving interval error determination is made in the above-mentioned determination block 223, and adds a variation value 6 with respect to the above-mentioned first adding-subtracting means 230$a$.

furthermore, numeral 234$a$ designates a storage memory of a first variation value that acts when all of the above-mentioned determination blocks 207, 217 and 223 determine that it is normal, and subtracts a variation value 1 with respect to the above-mentioned first adding-subtracting means 230$a$. Numeral 235$a$ designates a storage memory of an initial value to be initialized in a current value memory of the above-mentioned first adding-subtracting means 230$a$. Numeral 236$a$ designates a storage memory of a determination threshold in which, for example, the value of 11 is used. Numeral 237$a$ designates a first set data memory including the above-mentioned storage memories 231$a$–236$a$.

Numeral 238$a$ designates first error occurrence definition means. This first error occurrence definition means 238$a$ generates a first error detection signal ER1 when a current value of the above-mentioned first adding-subtracting means 230$a$ exceeds a value of the determination threshold "11" that is stored in the above-mentioned storage memory.

Numeral 230$b$ designates second adding-subtracting means, which is constituted of, for example, a reversible counter, an initial value of which is set to 9, and a current value of which is restricted so as not to be less than 0. Numeral 231$b$ designates a storage memory of a second variation value that acts when a bit error is determined in the above-mentioned determination blocks 202 and 212, and adds a variation value 3 with respect to the above-mentioned second adding-subtracting means 230b.

Further, numeral 233b designates a storage memory of a third variation value that acts when a receiving interval error determination is made in the above-mentioned determination block 202, and adds a variation value 6 with respect to the above-mentioned second adding-subtracting means 230b. Numeral 234b designates a storage memory of a first variation value that acts when both of the above-mentioned determination blocks 202 and 212 determine that it is normal, and subtracts a variation value 1 with respect to the above-mentioned second adding-subtracting means 230b.

Further, numeral 235b designates a storage memory of an initial value to be initialized in a current value memory of the above-mentioned second adding-subtracting means 230b. Numeral 236b designates a storage memory of a determination threshold in which, for example, a value of 11 is used. Numeral 237b a second set data memory including the above-mentioned storage memories 231b–236b.

Furthermore, numeral 238b designates second error occurrence definition means. This second error occurrence definition means 238b generates a second error detection signal ER2 when a current value of the above-mentioned second adding-subtracting means 230b exceeds a value of the determination threshold "11" that is stored in the above-mentioned storage memory 236b.

Numeral 239 designates error occurrence storage means for storing the operation of the above-mentioned first and second error detection signals ER1 and ER2. The above-mentioned alarm and display (annunciation means) 108 operates in response to an error storage signal provided by the foregoing error occurrence storage means 239.

Figure 3:
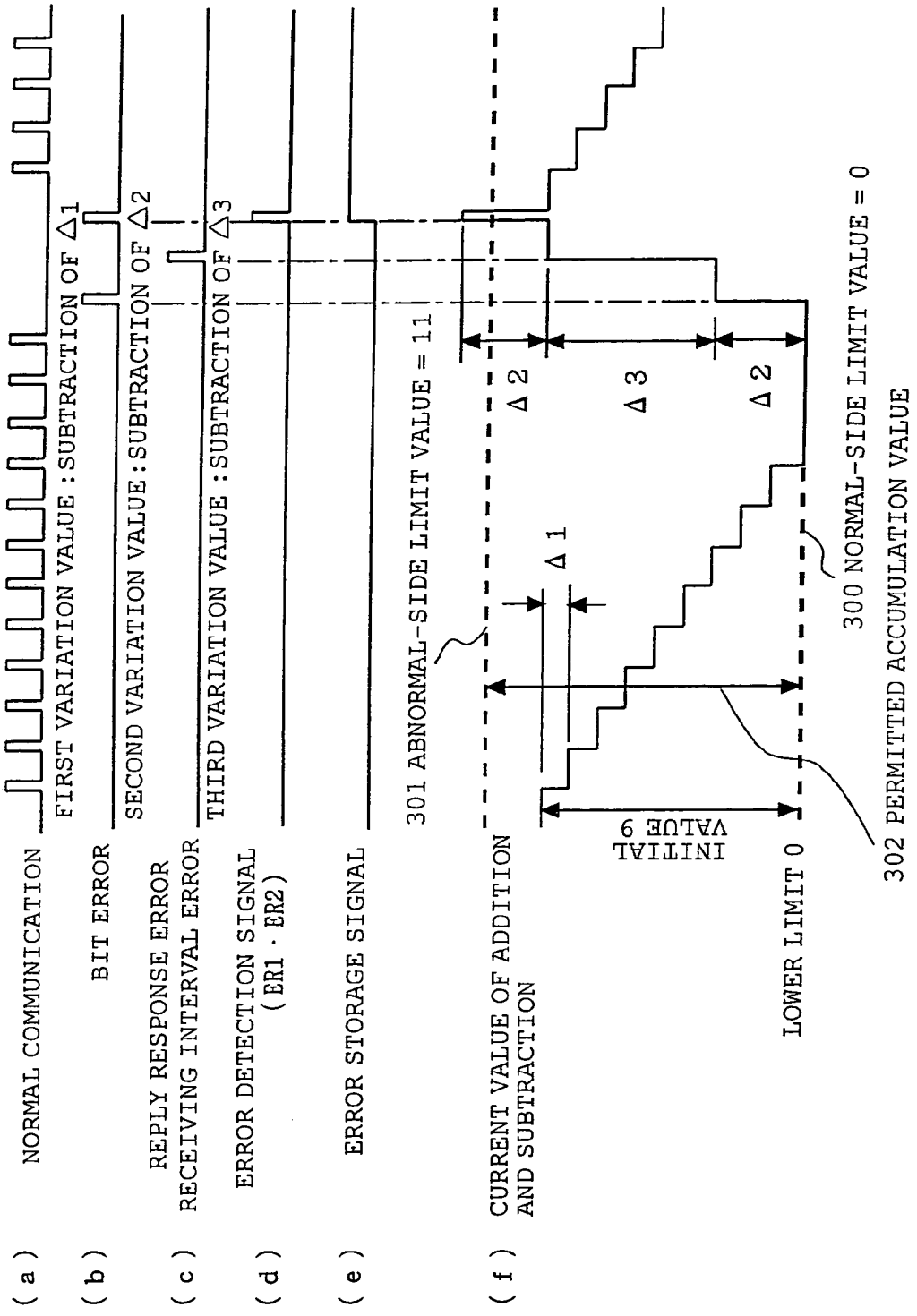
FIG. 3 is a chart for explaining the operation of a first and second adding-subtracting means of the electronic control unit according to the first embodiment.

FIG. 3 is a chart for explaining operations of the above-mentioned first adding-subtracting means 230a and second adding-subtracting means 230b.

With reference to FIG. 3, FIG. 3(a) indicates a normal receiving signal generated when communication error determination means determines the normal receiving. FIG. 3(b) indicates an abnormal receiving signal generated when the communication error determination means makes a bit error determination. FIG. 3(c) indicates an abnormal receiving signal generated when the communication error determination means makes a reply response error determination or a receiving interval error determination. FIG. 3(d) indicates the first and second error detection signals ER1 and ER2 that the first and second error occurrence definition means 283a and 283b generate. FIG. 3(e) indicates an error storage signal that error generation storage means 239 generates. FIG. 3(f) indicates a characteristic diagram showing the change in current value of the first and second adding-subtracting means 230a and 230b.

Furthermore, with reference to FIG. 3(f), numeral 300 designates a normal side limit value of a current value (lower limit=0). Numeral 301 designates an abnormal side limit value of a current value (upper limit=11). Numeral 302 designates an acceptable accumulation value (11−0=11) corresponding to a deviation between the above-mentioned abnormal side limit value 301 and normal side limit value 300.

Although an initial value of a current value of the first and second adding-subtracting means 230a and 230b is "9", subtraction of the first variation value Δ1="1" is carried out upon generation of a normal receiving signal, shown in FIG. 3(a). This subtraction results in decrease in current value. When a current value reaches a normal side limit value "0", the subtraction is limited so as not to be subtracted exceeding the normal side limit value "0".

When any abnormal receiving signal accompanied by the bit error, shown in FIG. 3(b), is generated, the addition of the second variation value Δ2="3" is carried out. When any abnormal receiving signal accompanied by the reply response error or the receiving interval error, shown in FIG. 3(c), is generated, the addition of the third variation value Δ3="6" is carried out.

As a result, when any addition value of cancellation (including counteraction) with the above-mentioned first variation value and the above-mentioned second and third variation values, exceeds the abnormal side limit value 11, error detection signals ER1 and ER2 of FIG. 3(d) are generated.

Furthermore, when an error detection signal ER1 or ER2 is generated, a current value of the first and second adding-subtracting means 230a and 230b are reset to the initial value "9".

Figure 4:
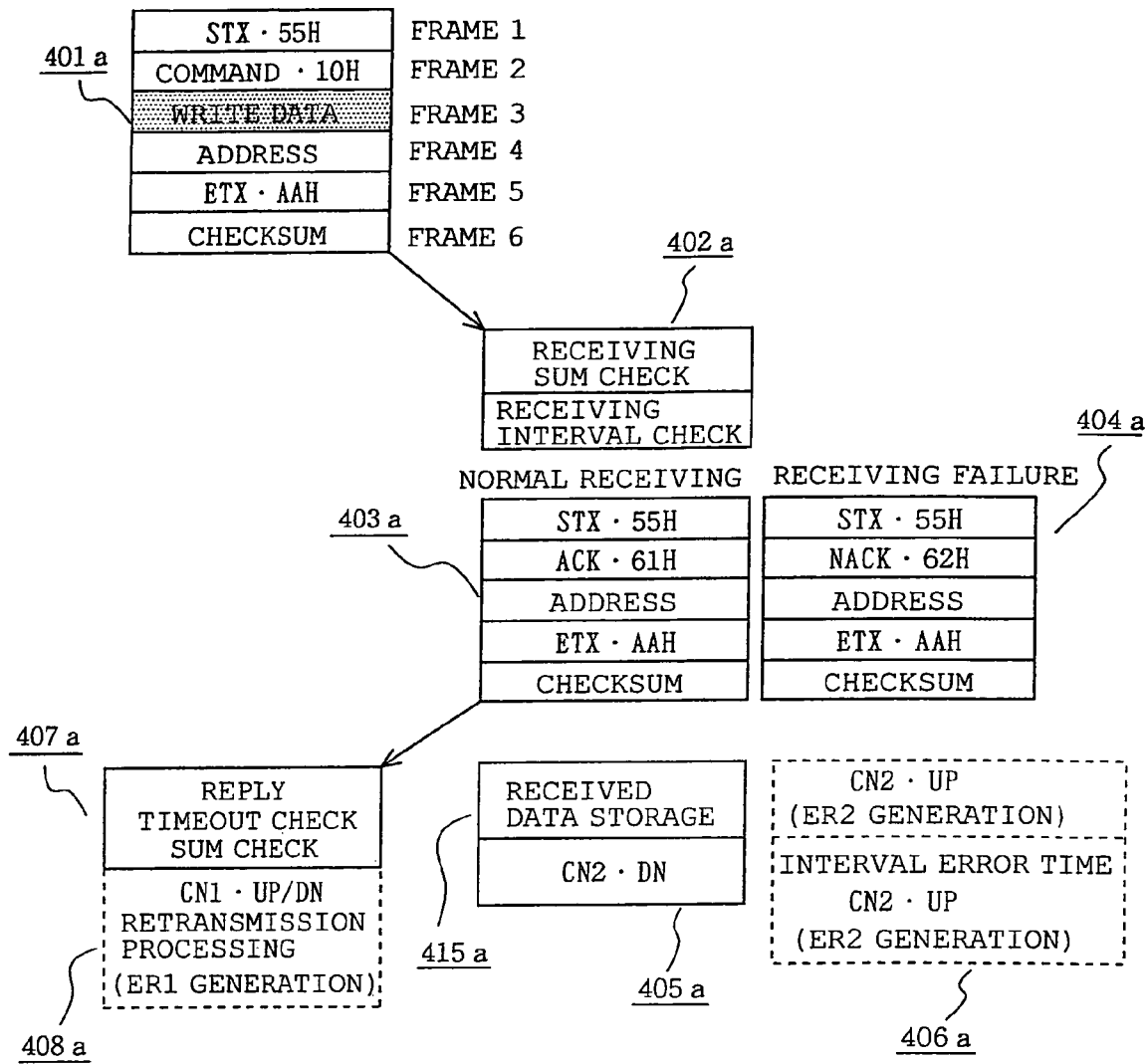
FIG. 4 is a diagram showing the constitution of a regular transmission packet of the electronic control unit according to the first embodiment.
Figure 5:
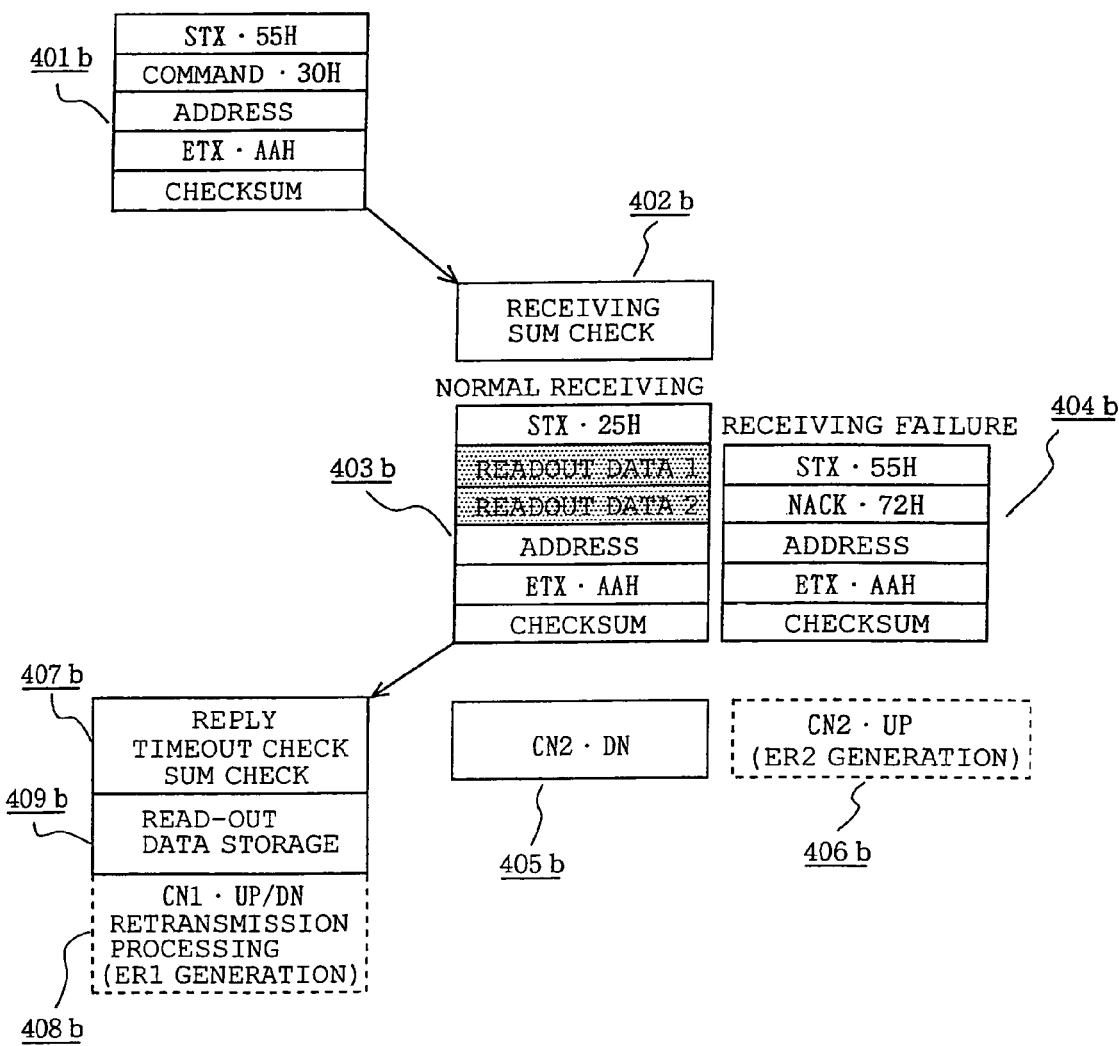
FIG. 5 is a diagram showing the constitution of an irregular transmission packet of the electronic control unit according to the first embodiment.
Figure 6:
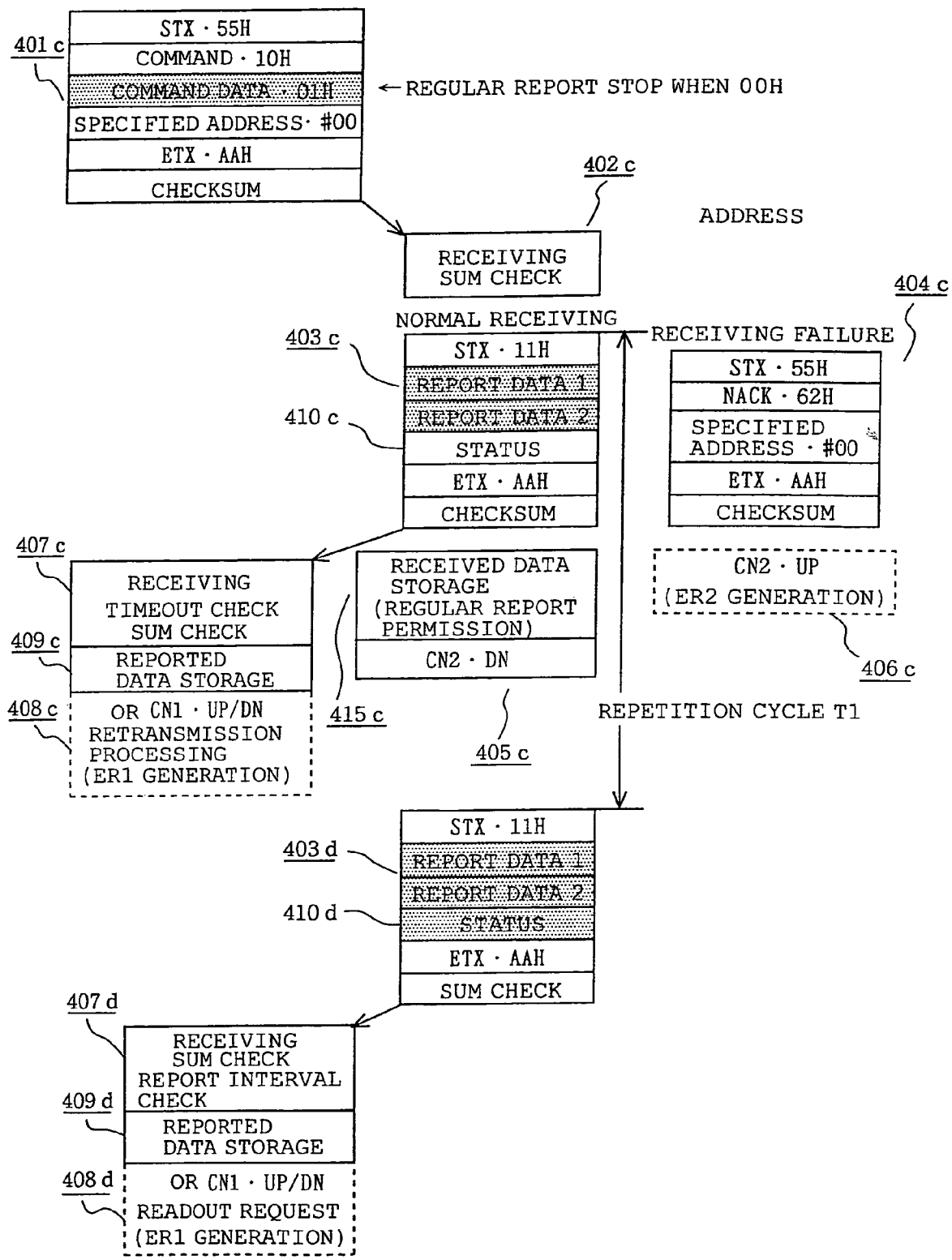
FIG. 6 is a diagram showing the constitution of a regular report packet of the electronic control unit according to the first embodiment.

FIGS. 4 to 6 show a packet constitution of a serial communication in the electronic control unit according to the first embodiment shown in FIG. 1. FIG. 4 shows a packet constitution of a regular transmission packet 401a. FIG. 5 shows a packet constitution of an irregular transmission packet 401b. FIG. 6 shows a packet constitution of regular report packets 403c and 403d.

With reference to FIGS. 4 to 6, a serial data to be communicated between the first series-parallel converter 117 and the second series-parallel converter 127 consists of 11 bits of data in total including a net data of 8 bits per one frame, a start bit, a stop bit, and a parity bit that are added at the series-parallel converter on the transmission side. On the receiving side, a parity check is carried out. In the case of presence of any error, the received data is discarded; while in the case of absence of error, only 8 bits of net data is extracted.

Further, 8 bits of data, described hereinafter, is given in hexadecimal numerals, and this hexadecimal is shown by a code H.

FIG. 4 shows the constitution of a regular transmission packet and a confirmation reply packet in the case where any indirect output signal is transmitted, or any set constant is transmitted to the second set data memory 237b from the first control circuit section 200a (master station) to the second control circuit section 200b (sub station).

With reference to FIG. 4, numeral 401a designates a regular transmission packet acting as regular transmission means from the master station to the sub station (corresponding to a regular transmission packet 201 of FIG. 2). The foregoing regular transmission packet 401a consists of frames 1 to 6, being a start data 55H, a command 10H, a write data, a storage location address, an end data AAH and a checksum data.

Numeral 402a designates a second communication error determination block (corresponding to the determination block 202 of FIG. 2) that acts when the sub station receives a series of data with the above-mentioned regular transmission packet 401a, and executes a bit error determination for detecting the presence or absence of any lack and mix of bits by the parity check or the sum check, or executes the receiving interval error determination of whether or not any normal receiving interval of the above-mentioned regular transmission packet 401a exceeds a predetermined time period.

Numeral 403a designates a confirmation reply packet of a normal receiving (ACK) to be replied to the master station when the determination of the above-mentioned second communication error determination block 402a is the normal receiving (corresponding to the confirmation reply packet 205 of FIG. 2). The foregoing confirmation reply packet consists of five frames of a start data 55H, an acknowledged data 61H, a storage location address, an end data AAH and a checksum data.

Numeral 404*a* designates a confirmation reply packet of a receiving failure (NACK) to be replied to the master station when the determination of the above-mentioned communication error determination block 402*a* is the abnormal receiving. The foregoing confirmation reply packet consists of five frames of a start data 55H, a non-acknowledged data 62H, a storage location address, and end data AAH and a checksum data.

Numeral 415*a* designates a write setting block that stores an indirect output signal or a set constant regularly transmitted after having replied the above-mentioned confirmation reply packet 430*a* (corresponding to the block 203 of FIG. 2). Numeral 405*a* designates a normal receiving processing block in which the above-mentioned second adding-subtracting means 230*b* subtracts the first variation value "1". Numeral 406*a* designates a failure receiving processing block in which the second adding-substracting means 230*b* adds the second or third variation value responsive to a determination result of the above-mentioned second communication error determination block 402*a* after having replied a confirmation reply packet 404*a*; and which generates the second error detection signal ER2 when a current value of the above-mentioned second adding-subtracting means 230*b* exceeds "11".

Numeral 407*a* designates a first communication error determination block (corresponding to the determination block 207 of FIG. 2) acting as bit error determination means or reply response error determination means that acts when the master station receives the above-mentioned confirmation reply packet 403*a* or 404*a* having been replied from the sub station. Numeral 408*a* designates a reply-incoming processing block in which the above-mentioned first adding-subtracting means 230*a* executes any addition and subtraction in accordance with a determination result of the foregoing determination block, or a retransmission processing is executed with the above-mentioned regular transmission packet 401*a*. In the foregoing reply-incoming processing block 408*a*, the regular transmission packet 401*a* is retransmitted in the case where a determination result of the above-mentioned first communication error determination block 407*a* is abnormal, or the above-mentioned confirmation reply packet 404*a* indicating the receiving failure is normally received; and the first error detection signal ER1 is generated when a current value of the above-mentioned first adding-subtracting means 230*a* exceeds "11".

FIG. 5 shows constitutions of an irregular transmission packet and a report reply packet in the case where the first control circuit section 200*a* (master station) makes a request for readout of any indirect input signal with respect to the second control circuit section 200*b* (sub station), or makes a request for readout of any saved data having been written and set already with a regular transmission packet 401*a*.

With reference to FIG. 5, numeral 401*b* designates an irregular transmission packet (corresponding to the irregular transmission packet 211 of FIG. 2) in the case where the master station makes the request for readout of various data with respect to the sub station (readout from the sub station to the master station). At the time of the readout request, first an irregular-transmission packet 401*b* from the master station to the sub station is transmitted, and an address of data intended to read out is specified.

In addition, the above-mentioned irregular transmission packet 401*b* consists of five frames of a start data 55H, a command 30H, a readout location address, and end data AAH and a checksum data.

Numeral 402*b* designates a second communication error determination block (corresponding to the determination block 212 of FIG. 2) that acts when the sub station receives a series of data with the above-mentioned irregular transmission packet 401*b*, and executes the bit error determination in which presence or absence of any lack and mix of bits is detected by the parity check or the sum check.

Numeral 403*b* designates a report reply packet (corresponding to the report reply packet 215 of FIG. 2) to be replied to the master station when the determination of the above-mentioned second communication error determination block 402*b* is a normal receiving. The foregoing report reply packet consists of six frames of a start data 25H, a readout data 1, a readout data 2, a readout location address, an end data AAH and a checksum data.

In addition, the above-mentioned readout location address is a storage location address of the readout data 1. In the case where a readout data is 8 bits of data, the readout data 2 is a data of the address subsequent to that of the readout data 1 (for example, supposing that an address of the readout data 1 is 100 house number, an address of the readout data 2 is 101 house number).

Further, in the case where a readout data of the readout location address is 16 bits of data, the readout data 1 is a data of upper 8 bits, and the readout data 2 is a data of lower 8 bits.

Numeral 404*b* designates a confirmation reply packet to be replied to the master station when the determination of the above-mentioned second communication error determination block 402*b* is an abnormal receiving. The foregoing confirmation reply packet consists of five frames of a start data 55H, a non-acknowledged data 72H, a readout location address, and end data AAH and a checksum data.

Numeral 405*b* designates a normal receiving processing block in which the above-mentioned second adding-subtracting means 230*b* subtracts the first variation value "1" after having replied the above-mentioned report reply packet 403*b*.

Numeral 406*b* designates a failure receiving processing block in which the above-mentioned second adding-subtracting means 230*b* adds the second variation value responsive to a determination result of the above-mentioned second communication error determination block 402*b* after having replied the above-mentioned confirmation reply packet 404*b*; and which generates a second error detection signal ER2 when a current value of the second adding-subtracting means 230*b* exceeds "11".

Numeral 407*b* designates a first communication error determination block (corresponding to the determination block 217 of FIG. 2) acting as bit error determination means, reply response error determination means, or the like that acts when the master station receives the above-mentioned report reply packet 403*b* or confirmation reply packet 404*b* having been replied from the substation. Numeral 408*b* designates a reply-incoming processing block in which the addition and subtraction by the above-mentioned first adding-subtracting means 230*a* is executed in accordance with a determination result of the foregoing determination block, or a retransmission processing is carried out with the above-mentioned irregular transmission packet 401*b*. The foregoing reply incoming processing block transmits an irregular transmission packet 401*b* again in the case where a determination result of the above-mentioned first communication error determination block 407*b* is abnormal, or the above-mentioned confirmation reply packet 404*b* indicating the receiving failure is normally received; and generates the first error detection signal ER1 when a current value of the above-mentioned first adding-subtracting means 230*a* exceeds "11".

Numeral 409*b* designates a readout information storage block (corresponding to the block 224 of FIG. 2) that acts when the determination of the above-mentioned first communication error determination means 407*b* is a normal receiving of the report reply packet 403*b*, and stores an read-out data having been reported and replied.

FIG. 6 shows a frame constitution of a regular report packet in the case of transmitting an indirect input signal from the second control circuit section 200*b* (sub station) with respect to the first control circuit section 200*a* (master station). At the time of regular report of an indirect input signal, first a regular transmission packet 401*c* is transmitted from the master station to the sub station, and then the transmission permission for a regular report will be given.

With reference to FIG. 6, numeral 401*c* designates a regular transmission packet acting as regular report permission means including permission information of the regular report (corresponding to the regular transmission packet 201 of FIG. 2). The foregoing regular transmission packet 401*c* consists of 6 frames of a start data 55H, a command 10H, a command data 01H, a specified address #00, an end data AAH and a checksum data. The above-mentioned command data is a data to permit a regular report and specify a report cycle.

Numeral 402*c* designates a second communication error determination block (corresponding to the determination block 202 of FIG. 2) that acts when the sub station receives a series of data provided with the above-mentioned regular transmission packet 401*c*, and carries out a bit error determination in which any lack and mix of bits is detected by the parity check or the sum check.

Numeral 403*c* designates a first regular report packet (corresponding to the regular report packet 221 of FIG. 2) to be relied to the master station when the determination of the above-mentioned second communication error determination block 402*c* is a normal receiving. The foregoing regular report packet 403*c* consists of 6 frames of a start data 11H, a report data 1, a report data 2, a status information, and end data AAH and a checksum data.

Numeral 404*c* designates a confirmation reply packet (corresponding to the block 205 of FIG. 2) to be replied to the master station when the determination of the above-mentioned second communication error determination block 402*c* is an abnormal receiving. The foregoing confirmation reply packet 404*c* consists of 5 frames of a start data 55H, anon-acknowledged data 62H, a specified address #00, an end data AAH and a checksum data.

Numeral 415*c* designates a write setting block that stores the above-mentioned command data having been received in a device memory of a specified address #00, not shown, after having replied the above-mentioned regular report packet 403*c*.

Numeral 405*c* designates a normal receiving processing block in which the above-mentioned second adding-subtracting means 230*b* subtracts the first variation value "1" after having transmitted the above-mentioned regular report packet 403*c*.

Numeral 406*c* designates a failure receiving processing block in which the above-mentioned second adding-subtracting means 230*b* adds the second variation value responsive to a determination result of the above-mentioned second communication error determination block 402*c* after having replied the above-mentioned confirmation reply packet 404*c*; and which generates the second error detection signal ER2 when a current value of the second adding-subtracting means 230*b* exceeds "11".

Numeral 407*c* designates a first communication error determination block (corresponding to the determination block 207 of FIG. 2) acting as bit error determination means, reply response error determination means, or the like that acts when the master station receives the above-mentioned regular report packet 403*c* or confirmation reply packet 404*c* having been replied from the sub station. Numeral 408*c* designates an incoming processing block that carries out the addition and subtraction by the above-mentioned first adding-subtracting means 230*a* in accordance with a determination result of the foregoing determination block 407*c*.

In addition, the above-mentioned incoming processing block 408*c* transmits a regular transmission packet 401*c* again in the case where a determination result of the above-mentioned first communication error determination block 407*c* is abnormal, or the above-mentioned confirmation reply packet 404*c* indicating the receiving failure is normally received; and generates the first error detection signal ER1 when a current value of the above-mentioned first adding-subtracting means exceeds "11".

Numeral 409*c* designates an input information storage block (corresponding to the block 224 of FIG. 2) that acts when the determination of the above-mentioned first communication error determination means 407*c* is a normal receiving of the regular report packet 403*c*, and stores the first reported data having been regularly reported.

Numeral 403*d* designates a regular report packet to be transmitted to the master station at the time when a specified report cycle T1 has passed since the transmission of the above-mentioned regular report packet 403*c* (corresponding to the regular report packet 221). The foregoing regular report packet has the same frame constitution as the above-mentioned regular report packet 403*c*.

Numeral 407*d* designates a first communication error determination block acting as bit error determination means, receiving interval error determination means, or the like that acts when the master station receives the above-mentioned regular report packet 403*d* having been transmitted from the sub station (corresponding to the determination block 223 of FIG. 2). Numeral 408*d* designates an incoming processing block in which the above-mentioned first adding-subtracting means 230*a* executes an addition and subtraction in accordance with a determination result of the foregoing determination block 407*d*.

In addition, the above-mentioned incoming processing block 408*d* makes a readout request with an irregular transmission packet 401*b* when a determination result of the above-mentioned first communication error determination block 407*d* is abnormal; and generates the first error detection signal ER1 when a current value of the above-mentioned first adding-subtracting means 230*a* exceeds "11".

Numeral 409*d* designates an input information storage block (corresponding to the block 224 of FIG. 2) that acts when the determination of the above-mentioned first communication error determination means 407*d* is a normal receiving of a regular report packet 403*d*, and stores a reported data having been regularly reported.

Status information 410*c* and 410*d*, which are contained in the above-mentioned regular report packets 403*c* and 403*d* is constituted as described later in detail referring to FIG. 15. A current value of the above-mentioned second adding-subtracting means 230*b* is stored in the lower 4 bits; a mnemonic address of an input having been regularly reported is stored in the subsequent upper 3 bits; and a readout request flag information is stored in the upper most 1 bit. When the above-mentioned readout request flag is at a logic level "1", the request for readout of a selected data memory of a specified address is carried out with an irregular transmission packet 401*b*.

In addition, for example, a device number or an error code number of any error occurrence that the second control circuit section 200*b* intends to report immediately is stored in the above-mentioned selected data memory. They are information unnecessary to be reported on a steady basis.

Further, a command data of the above-mentioned regular transmission packet 401*c* specifies an interval of a repetition cycle T1 of the regular report. When the foregoing command data is set, for example, to 00H, the regular report is stopped.

Figure 7:
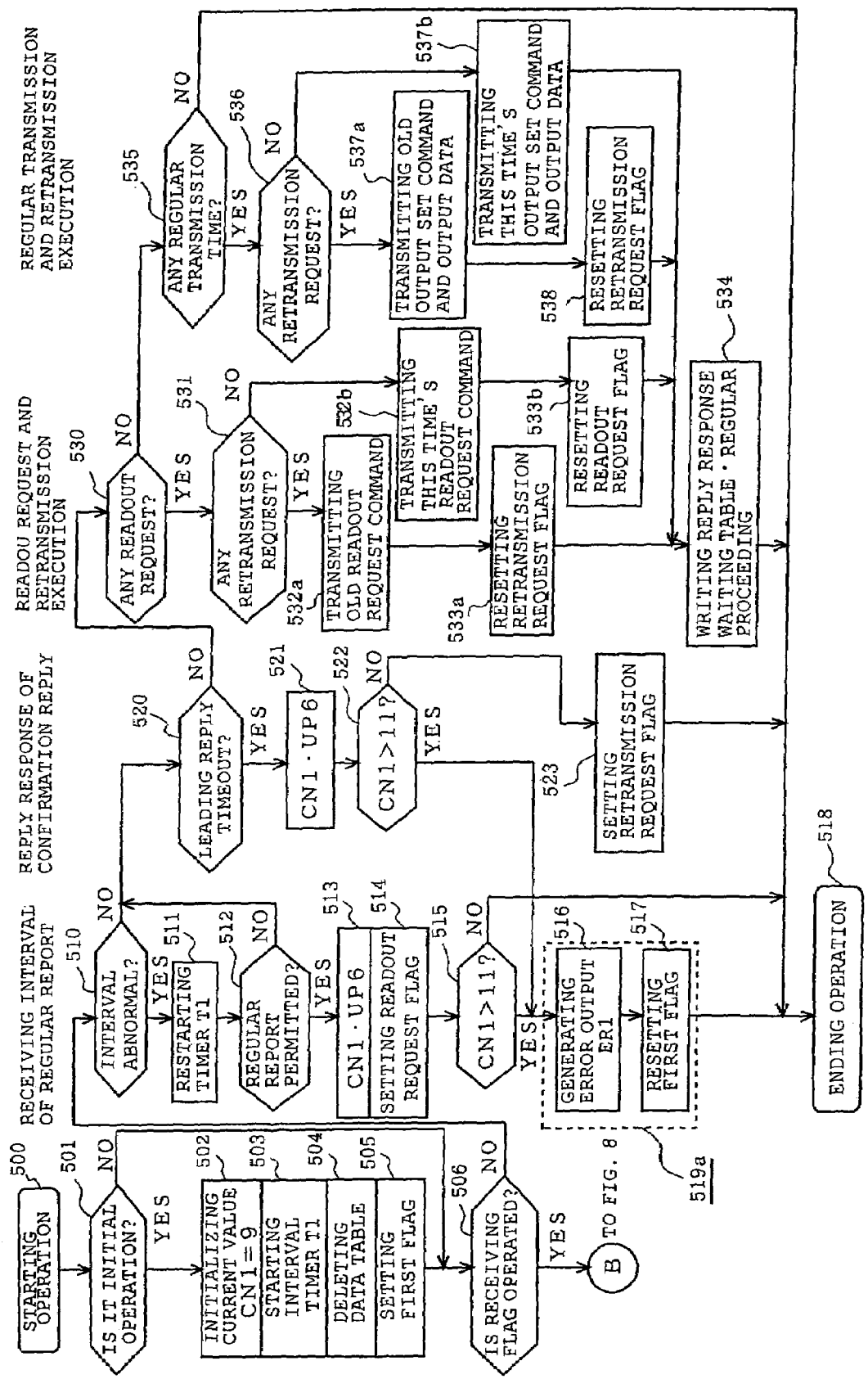
FIG. 7 is a flowchart for explaining a transmission operation in the first control circuit section of the electronic control unit according to the first embodiment.
Figure 8:
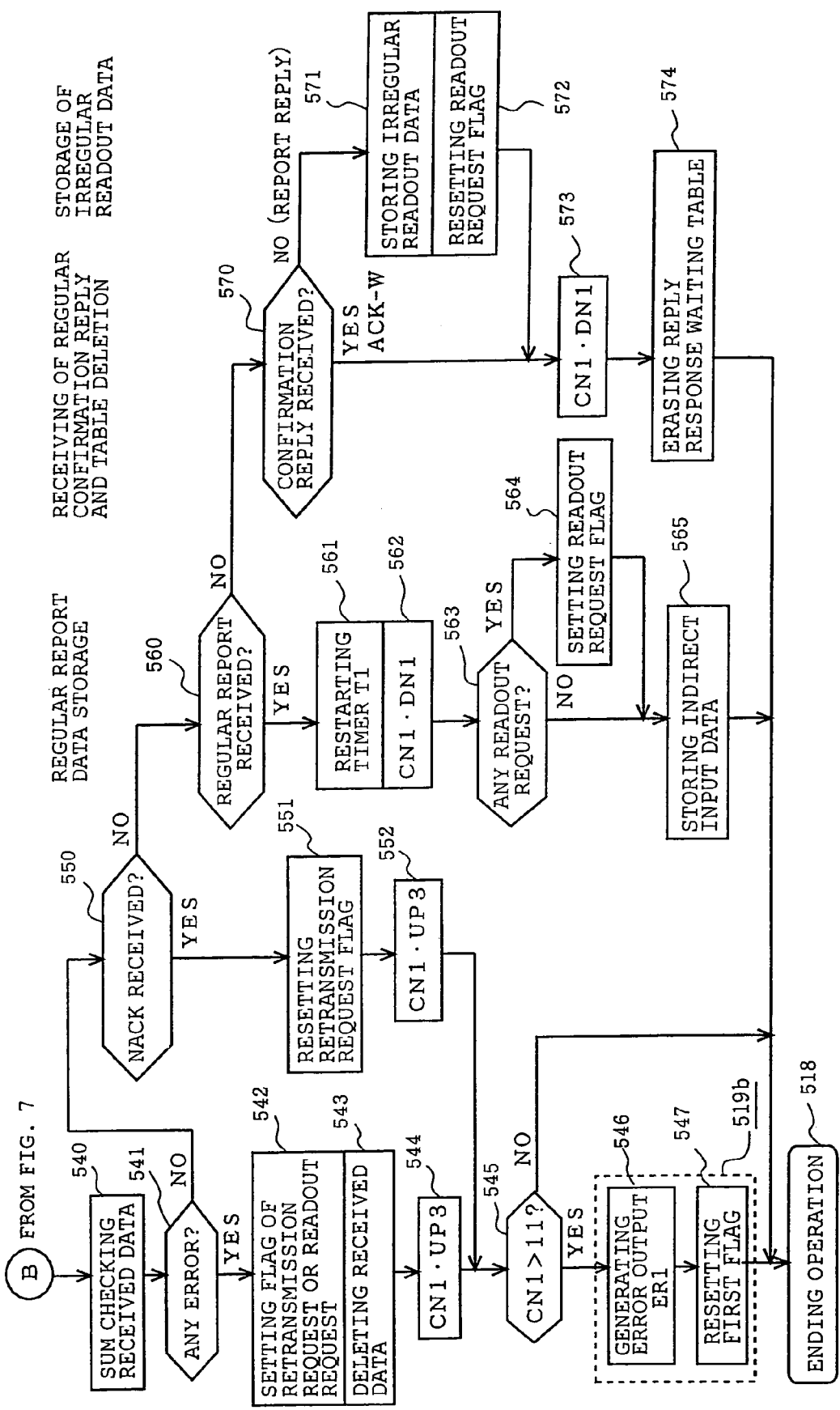
FIG. 8 is a flowchart for explaining a receiving operation in the first control circuit section of the electronic control unit according to the first embodiment.

Now, operations in the first control circuit section of the electronic control unit according to this first embodiment are described referring to FIGS. 7 and 8.

In this respect, FIG. 7 shows mainly a flow of transmission operation in the first control circuit section 200*a*. FIG. 8 shows mainly a flow of receiving operation in the first control circuit section 200*a*.

With reference to FIG. 7, numeral 500 is an operation start step of the microprocessor 110*a* that is regularly activated. The foregoing start step 500 is activated when the power supply switch 105*a* of FIG. 1 is turned on, and when a reset pulse signal RST1 is supplied to the main CPU 110*a*, and the foregoing start step 500 operates in a circulating manner subsequently to the later-described operation end step 518.

Numeral 501 is a step that acts subsequently to the above-mentioned Step 500, and determines whether or not it is a first operation depending on whether or not a first flag is set in the later-described Step 505. Numeral 502 is a step that acts when the determination of the foregoing Step 501 is YES (first operation), and sets a current value of the first adding-subtracting means 230*a* to the initial value "9".

Numeral 503 is a step that acts subsequently to the above-mentioned Step 502, and starts up an interval timer T1 the interval of which corresponds to a report repetition cycle T1 of FIG. 6. Numeral 504 is a step that acts subsequently to the foregoing Step 503, and deletes a content of the reply-waiting data table 206 of FIG. 2. Numeral 505 is a step that acts subsequently to the foregoing Step 504, and sets the first flag, not shown. The above-mentioned first flag is reset when the power supply switch 105*b* of FIG. 1 is turned on and when a reset pulse signal RST1 is supplied to the main CPU 11*a*.

Numeral 506 is a step that acts when the determination of the above-mentioned Step 501 is NO (it is not the first operation) or subsequently to the above-mentioned Step 505, and determines whether or not a receiving flag is operated indicating the fact that the first series-parallel converter 117 has received a serial data having been transmitted from the second series-parallel converter 127 to complete a parallel conversion. When the determination of the foregoing Step 506 is YES (receiving completion), the program proceeds to Step 540, shown in FIG. 8.

Numeral 510 is a step that acts when the determination of the above-mentioned Step 506 is NO (receiving flag is not operated yet), and determines whether or not the timer T1 having been started in the above-mentioned Step 503 and the later-described Step 511 or 561 (FIG. 8) has come to a state of Time's Up. Numeral 511 is a step that acts when the determination of the foregoing Step 510 determines YES (Time's Up), and restarts the timer T1. Numeral 512 is a step that acts subsequently to the foregoing Step 511, and discriminates whether or not the permission for regular report transmission has been given already with the regular transmission packet 401*c* of FIG. 6 and a command data 01H is written in a memory of an address #00. Numeral 513 is a step that acts when the determination of the foregoing Step 512 is YES (regular report permission is present), and adds 6 counts to operation means CN1 acting as first adding-subtracting means. Numeral 514 is a step that acts subsequently to the foregoing Step 513, and sets a readout request flag.

Numeral 515 is a step that acts subsequently to the above-mentioned Step 514, and determines whether or not a current value of the operation means CN1 acting as the first adding-subtracting means exceeds 11. Numeral 516 is a step that acts when the determination of the foregoing Step 515 is YES (exceeding 11), or when the determination of the later-described Step 522 is YES (exceeding 11), and generates a pulse output of the first error detection signal ER1. Numeral 517 is a step that acts subsequently to the foregoing Step 515, and resets the fist flag having been set in the above-mentioned Step 505. Numeral 518 is an operation end step that acts when the determination of the above-mentioned Step 515 is NO (not more than 11) or subsequently to the above-mentioned Step 517. Further, the above-mentioned operation start step 500 operates in a circulating manner subsequently to the foregoing Step 518.

In addition, numeral 519*a* is a step block that consists of the above-mentioned Steps 516 and 517, and acts as one of first initialization means.

Numeral 520 is a step that acts when the determination of the above-mentioned Step 510 is NO (timer T1 does not count up) or when the determination of the above-mentioned Step 512 is NO (regular report is not permitted), and determines whether or not a saving time period of a residual leading data of the reply-waiting data table (refer to numeral 206 of FIG. 2) having been written in the later-described Step 534 exceeds a predetermined reply response time period T. Numeral 521 is a step that acts when the determination of the foregoing Step 520 is YES—(timeout), and adds 6 counts to the operation means CN1 acting as the first adding-subtracting means. Numeral 522 is a step that acts subsequently to the foregoing Step 521, and determines whether or not a current value of the operation means CN1 acting as the first adding-subtracting means exceeds 11. Numeral 523 is a step that acts when the determination of the foregoing step 522 is NO (not more than 11), and sets a retransmission request flag. The program proceeds to the above-mentioned operation end step 518 subsequently to the foregoing Step 523.

Furthermore, the above-mentioned reply-waiting data table 206 is constituted of plural stages of shift register in which a stored data shifts every predetermined time period. In response to the fact that a reply-waiting command having been stored in the foregoing shift register shifts to an overflow register, a timeout determination by the above-mentioned Step 520 is carried out.

Numeral 530 is a step that acts when the determination of the above-mentioned Step 520 is NO (it is not timeout), and determines whether or not a readout request flag is set in the above-mentioned Step 514 or the later-described Steps 542 and 564 (FIG. 8). Numeral 531 is a step that acts when the determination of the foregoing Step 530 is YES (readout request is present), and determines whether or not a retransmission request flag is set in the above-mentioned Step 523 or the later-described Steps 542 and 551 (FIG. 8). Numeral 532*a* is a step that acts when the determination of the foregoing Step 531 is YES (retransmission request is present), and transmits the old readout request having been transmitted already with an irregular transmission packet 401b. Numeral 533a is a step that acts subsequently to the foregoing step 532a, and resets the retransmission request flag.

Numeral 532b is a step that acts when the determination of the above-mentioned Step 531 is NO (retransmission request is absent), and transmits with an irregular transmission packet 401b this time's readout request having been requested for the readout in the above-mentioned Step 530. Numeral 533b is a step that acts subsequently to the foregoing Step 532b, and resets a readout request flag. Numeral 534 is a step that acts subsequently to the above-mentioned Steps 533a and 533b or the later-described Steps 538 and 537b, and sequentially stores in the reply-waiting data table 206 command having been transmitted in the above-mentioned Steps 532a and 532b and the later-described Steps 537a and 537b; and carries out a shift operation of a data table acting as a shift register, and then proceeds to the above-mentioned operation end 518.

Numeral 535 is a step that acts when the determination of the above-mentioned Step 530 is NO (readout request is absent), and discriminates whether or not it is the time when a regular transmission is carried out with a regular transmission packet 401a. Numeral 536 is a step that acts when the discrimination of the foregoing Step 535 is YES (regular transmission time), and determines whether or not a retransmission request flag is set in the above-mentioned Step 523 or the later-described Steps 542 and 551 (FIG. 8) Numeral 537a is a step that acts when the determination of the foregoing Step 536 is YES (retransmission request is present), and transmits a regular transmission packet 401a based on the transmission command having been transmitted already. Numeral 538 is a step that acts subsequently to the foregoing Step 537a, and resets a retransmission request flag.

Numeral 537b is a step that acts when the determination of the above-mentioned Step 536 is NO (retransmission request is absent), and transmits this time's regular transmission packet 401a. When the determination of the above-mentioned Step 535 is NO (it is not a regular transmission time), the program proceeds to the above-mentioned operation end step 518.

With reference to FIG. 8, numeral 540 is a step that acts when the determination of the above-mentioned Step 506 (FIG. 7) is YES (receiving flag operates), and carries out a sum check of the received data.

In addition, a frame of a checksum, which is obtained by performing a binary addition of all frame data from a start data STX to an end data ETX, is added to each transmit-receive packet. Further, it is the sum check that performs the binary addition of all the frame data from a start data STX to a checksum data, and determines whether or not a result of this binary addition is a normal value 00H.

Numeral 541 is a step that acts subsequently to the above-mentioned Step 540, and determines whether or not there is any error as a result of the sum check. Numeral 542 is a step that acts when the determination of the foregoing Step 541 is YES (error is present), and sets a retransmission request flag or a readout request flag. Numeral 543 is a step that acts subsequently to the foregoing Step 542, and deletes the received data in which error is present. Numeral 544 is a step that acts subsequently to the foregoing Step 543, and adds 3 counts to the operation means CN1 acting as the first adding-subtracting means.

Additionally, when data having received in the above-mentioned Step 542 cannot be identified whether it is of a confirmation reply packet with respect to the regular transmission, a report reply packet with respect to an irregular transmission packet, or a regular report packet, no retransmission request flag or readout request flag is set.

Numeral 545 is a step that acts subsequently to the above-mentioned Step 544 or the later-described Step 552, and determines whether or not a current value of the operation means CN1 acting as the first adding-subtracting means exceeds 11. Numeral 546 is a step that acts when the determination of the foregoing Step 545 is YES (exceeding 11), and generates a pulse output of the first error detection signal ER1. Numeral 547 is a step that acts subsequently to the foregoing Step 546, and resets the first flag having been set in the above-mentioned Step 505 (FIG. 7). When the determination of the above-mentioned Step 545 is NO (not more than 11) or subsequently to the above-mentioned Step 547, the program proceeds to the above-mentioned operation end step 518, and then the above-mentioned operation start step 500 operates in a circulating manner.

In addition, numeral 519b is a step block that consists of the above-mentioned Steps 546 and 547, and acts as one of the first initialization means.

Numeral 550 is a step that acts when the determination of the above-mentioned Step 541 is NO (sum check error is absent), and determines whether or not the data having been received normally from the sub station is the one relating to the receiving failure (NACK) at the sub station. Numeral 551 is a step that acts when the determination of the foregoing Step 550 is YES (receiving failure), and sets a retransmission request flag. Numeral 552 is a step that acts subsequently to the foregoing Step 551, and adds 3 counts to the operation means CN1 acting as the first adding-subtracting means. Subsequently to the foregoing Step 552, the program proceeds to the above-mentioned Step 545.

Numeral 560 is a step that acts when the determination of the above-mentioned Step 550 is NO (it is not a receiving failure), and discriminates whether or not a received data is a regular report from the sub station with a regular report packet. Numeral 561 is a step that acts when the discrimination of the foregoing Step 560 is YES (regular report receiving), and restarts a report interval timer T1. Numeral 562 is a step that acts subsequently to the foregoing Step 561, and subtracts 1 count from a value of the operation means CN1 acting as the first adding-subtracting means. Numeral 563 is a step that acts subsequently to the foregoing step 562, and determines whether or not a readout request flag is set in the data having been reported regularly. Numeral 564 is a step that acts when the determination of the foregoing Step 563 is YES (readout request is present), and sets a readout request flag. Numeral 565 is a step that acts when the determination of the above-mentioned Step 563 is NO (readout request is absent) or subsequently to the above-mentioned Step 564, and stores and saves a regular report data having been received. The program proceeds to the above-mentioned operation end step 518 subsequently to the foregoing Step 565.

Figure 9:
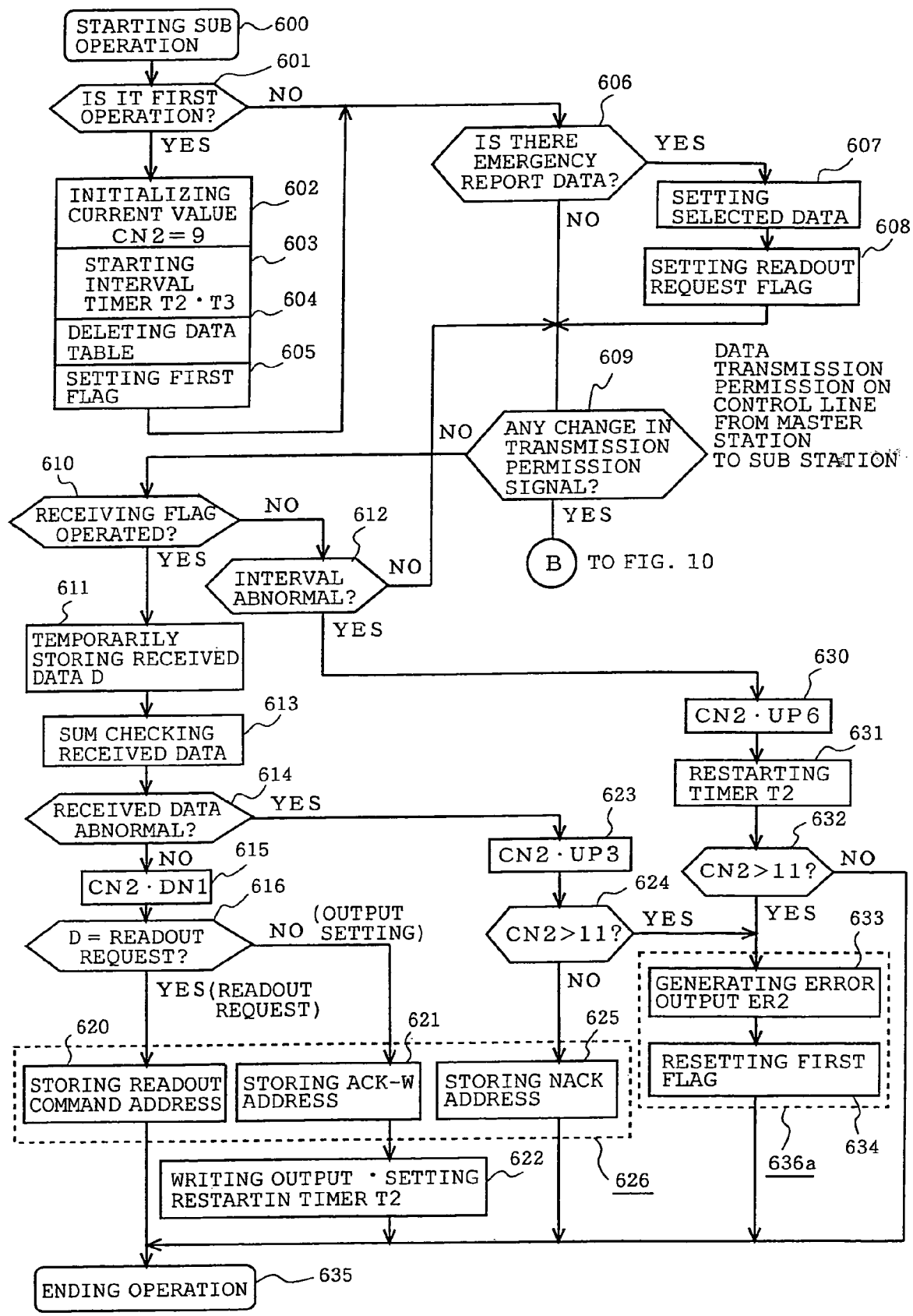
FIG. 9 is a flowchart for explaining a receiving operation in the second control circuit section of the electronic control unit according to the first embodiment.

In addition, the readout request flag in the above-mentioned Step 563 is the one that is set on the sub station side in Step 608 of FIG. 9.

Numeral 570 is a step that acts when the discrimination of the above-mentioned Step 560 is NO (it is not a receiving of regular report), and discriminates whether or not it is a receiving of a confirmation reply. Numeral 571 is a step that acts when the discrimination of the foregoing Step 570 is NO (it is not a confirmation reply with respect to the regular transmission, but a report reply with respect to the irregular transmission), and stores an irregular readout data having been replied and reported from the sub station. Numeral 572 is a step that acts subsequently to the foregoing Step 571, and resets a readout request flag having been set in the above-mentioned Step 514 (FIG. 7) or the above-mentioned Steps 542 and 564. Numeral 573 is a step that acts when the discrimination of the above-mentioned Step 570 is YES (confirmation reply of the normal receiving with respect to the regular transmission), or subsequently to the above-mentioned Step 572, and subtracts 1 count from a value of the operation means CN1 acting as the first adding-subtracting means. Numeral 574 is a step that acts subsequently to the foregoing Step 573, and erases a command that has been replied from in the reply-waiting data table 206 having been stored in Step 534 of FIG. 7. Subsequently to the foregoing Step 574, the program proceeds to the above-mentioned operation end step 518.

The heretofore operations are described in brief. With reference to FIGS. 7 and 8, numerals 519a and 519b are first initialization means that resets the first flag thereby carrying out Steps 502–504 in the next operation to initialize the first control circuit section 200a, and generates the first error detection signal ER1 to initialize and restart the second control circuit section 200b. Numeral 510 is first communication error determination means acting as receiving interval monitoring means of the regular report. Numeral 513 is first adding-subtracting means for adding the third variation value "6". Numeral 516 is first error occurrence definition means for generating the first error detection signal ER1. Numeral 520 is first communication error determination means acting as reply delay monitoring means. Numeral 521 is first adding-subtracting means for adding the third variation value "6". Numeral 532a is retransmission means of an irregular transmission packet with respect to the retransmission request. Numeral 532b is irregular transmission means responsive to the readout request. Numeral 537a is retransmission means with respect to the regular transmission. Numeral 537b is regular transmission means.

Further, with reference to FIG. 8, numeral 540 is first communication error determination means acting as bit information monitoring means. Numeral 544 is first adding-subtracting means for adding the second variation value "3". Numeral 546 is first error occurrence definition means for generating the first error detection signal ER1. Numeral 552 is first adding-subtracting means for adding the second variation value "3". Numeral 562 and 573 is first adding-subtracting means for subtracting the first variation value "1".

In addition, the determination block 207 of FIG. 2 includes the first communication error determination means 540 acting as bit information monitoring means and the first communication error determination means 520 acting as reply delay monitoring means. Likewise, the determination block 217 includes the first communication error determination means 540 acting as bit information monitoring means and the first communication error determination means acting as reply delay monitoring means. Further, the determination block 223 includes the first communication error determination means 540 acting as bit information monitoring means and the first communication error determination means 510 acting as receiving interval monitoring means of the regular report.

Figure 10:
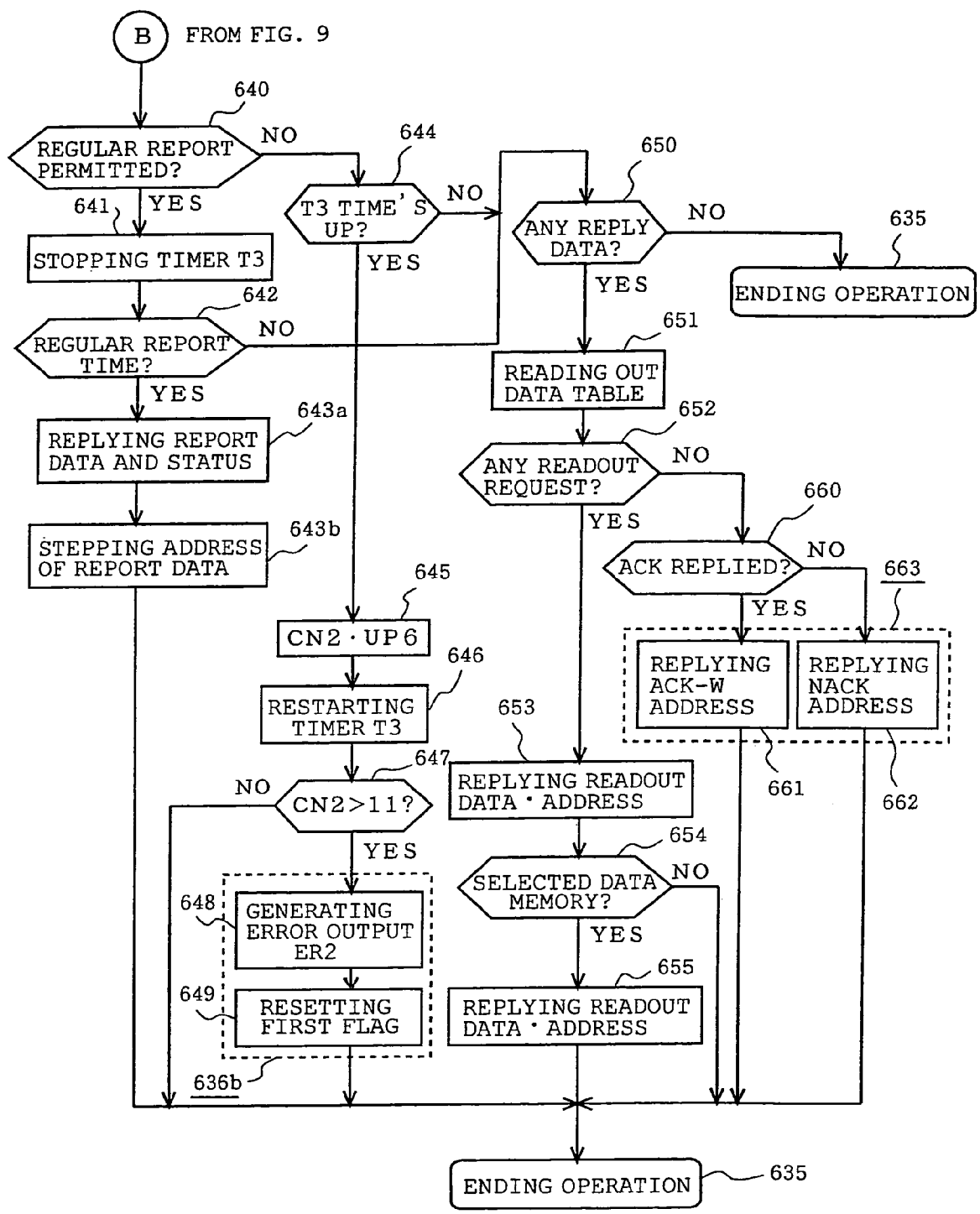
FIG. 10 is a flowchart for explaining a transmission operation in the second control circuit section of the electronic control unit according to the first embodiment.

Now, with reference to FIGS. 9 and 10, operations of communication control in the second control circuit section of the electronic control unit according to this first embodiment are described.

In this respect, FIG. 9 shows mainly an equivalent control flow relating to a receiving operation of the associative control circuit section 120a in the second control circuit section 200b. FIG. 10 shows mainly an equivalent control flow relating to a transmission operation of the associative control circuit section 120a in the second control circuit section 200b.

With reference to FIG. 9, numeral 600 is an operation start step of the associative control circuit section 120a that is regularly activated. The foregoing start step 600 is activated when the power supply switch 105b of FIG. 1 is turned on and when a reset pulse signal RST2 is supplied; and operates in a circulating manner subsequently to the later-described operation end step 635.

Numeral 601 is a step that acts subsequently to the above-mentioned Step 600, and determines whether or not it is a first operation depending on whether or not a first flag is set in the later-described Step 605. Numeral 602 is a step that acts when the determination of the foregoing Step 601 is YES (first operation), and sets a current value of a second adding-subtracting means 230b to an initial value "9". Numeral 603 is a step-that acts subsequently to the foregoing Step 602, and starts an interval timer T2 corresponding to a regular transmission cycle and the delay monitoring timer T3 described later. Numeral 604 is a step that acts subsequently to the foregoing Step 603, and deletes a content of the unprocessed data table 204 of FIG. 2. Numeral 605 is a step that acts subsequently to the foregoing Step 604, and sets the first flag, not shown. The above-mentioned first flag is reset when the power supply switch 105b, not shown, is turned on and when a reset pulse signal RST2 is supplied to the associative control circuit section 120a.

Numeral 606 is a step that acts when the determination of the above-mentioned Step 601 is NO (it is not the first operation), or subsequently to the above-mentioned Step 605, and determines whether or not any error is detected by, e.g., self-diagnosis of an input/output in the associative control circuit section 120a and there is any request for this error to be immediately reported to the master station. Numeral 607 is a step that acts when the determination of the foregoing Step 606 is YES (emergency report data is present) and writes a data content such as error occurrence input/output number or error code number intended to be reported to a selection data memory of a specified address. Numeral 608 is a step that acts subsequently to the foregoing Step 607 and sets a readout request flag. Numeral 609 is a step that acts when the determination of the above-mentioned Step 606 is NO (emergency report data is absent) or subsequently to the above-mentioned Step 608, and determines whether or not a logic level of a control signal line, not shown, is inverted, and a transmission permission to the master station is given.

In addition, when the determination of the above-mentioned Step 609 is YES (change in transmission permission signal is present), the program proceeds to Step 640 of FIG. 10.

Numeral 610 is a step that acts when the determination of the above-mentioned Step 609 is NO (transmission permission is absent), and determines whether or not a receiving flag operates indicating that the second series-parallel converter 127 receives a serial data having been transmitted from the first series-parallel converter 117, completes a parallel conversion. When the determination of the foregoing Step 510 is NO (not receiving yet), the program proceeds to the later-described Step 612.

Numeral 611 is a step tat acts when the determination of the above-mentioned Step 610 is YES (receiving flag operates), and temporarily stores a series of received data having been received form the master station in a register D.

Numeral 612 is a step that determines whether or not the receiving interval monitoring timer T2 having been started in the above-mentioned Step 603 is Time's Up. When the determination of the foregoing Step 612 is NO and there is no receiving interval error, the program proceeds to the above-mentioned Step 609. When the determination of Step 612 is YES and there is any receiving interval error, the program proceeds to the later-described Step 630.

Numeral 613 is a step that acts subsequently to the above-mentioned Step 611, and carries out a sum check of a series of received data having been received by the above-mentioned Step 611. Numeral 614 is a step that acts subsequently to the foregoing Step 613, and determines whether or not there is any error in the received data. Numeral 615 is a step that acts when the determination of the foregoing Step 614 is NO (normal), and subtracts 1 count from a value of operation means CN2 acting as second adding-subtracting means. Numeral 616 is a step that acts subsequently to the foregoing Step 615, and discriminates whether a received data by the above-mentioned Step 611 is an output setting with a regular transmission packet 401*a* or a readout request with an irregular transmission packet 401*b*.

Numeral 620 is a step that acts when the discrimination of the above-mentioned Step 616 is a readout request, and temporarily stores a readout request command 30H and an address. Numeral 621 is a step that acts when the determination of the above-mentioned Step 616 is the output setting, and temporarily stores an ACK•61H and the address. Numeral 622 is a step that acts subsequently to the foregoing Step 621, and stores an output set data having been obtained in the above-mentioned Step 611 in a device memory of a specified address or a second a second set data memory 237*b*, and restarts the receiving interval monitoring timer T2.

Numeral 623 is a step that acts when the determination of the above-mentioned Step 614 is YES (received data is abnormal), and adds 3 counts to a value of the operation means CN2 acting as the second adding-subtracting means. Numeral 624 is a step that acts subsequently to the foregoing Step 623, and determines whether or not a current value of the operation means CN2 acting as the second adding-subtracting means exceeds 11. Numeral 625 is a step that acts when the determination of the foregoing Step 624 is NO (not more than 11), and temporarily stores an NACK•82H and the address. The program proceeds to the above-mentioned operation end step 635 subsequently to the above-mentioned Steps 620, 622, 625.

Numeral 626 is a step block that consists of the above-mentioned Steps 620, 621, 625. This step block is a reply command data that is stored in the unprocessed data table 204 of FIG. 2.

In addition, an NACK reply code corresponding to the readout request or the output setting is not separated in the above-mentioned Step 625. As shown in FIGS. 4 and 5, however, it is also possible to separate this NACK reply code at 62H or 72H by noting a start data STX.

Numeral 630 is a step that acts when the determination of the above-mentioned Step 612 is YES (receiving interval of regular transmission data is too large), and adds 6 counts to a value of the operation means CN2 acting as the second adding-subtracting means. Numeral 631 is a step that acts subsequently to the foregoing Step 630, and restarts the receiving interval timer T2. Numeral 632 is a step that acts subsequently to the foregoing Step 631, and determines whether or not a current value of the operation means CN2 acting as the second adding subtracting means exceeds 11.

Numeral 633 is a step that acts when the determination of the foregoing Step 632 is YES (exceeding 11) or when the determination of the above-mentioned Step 624 is YES (exceeding 11), and generates a pulse output of the second error detection signal ER2. Numeral 634 is a step that acts subsequently to the foregoing Step 633, and resets the first flag having been set in the above-mentioned Step 605. The program proceeds to the above-mentioned operation end step 635 when the determination of the above-mentioned Step 632 is NO (not more than 11) or subsequently to the above-mentioned Step 634.

In addition, numeral 636*a* is a step block that consists of the above-mentioned Steps 633 and 634, and acts as one of second initialization means.

With reference to FIG. 10, numeral 640 is a step that acts when the determination of the above-mentioned Step 609 (FIG. 9) is YES (transmission permission is present), and determines whether or not a regular transmission packet 401*c* of FIG. 6 is received and a regular report is permitted. Numeral 641 is a step that acts when the determination of the foregoing Step 640 is YES (regular report is permitted), and stops the timer T3 having been started in the above-mentioned Step 603. Numeral 642 is a step that acts subsequently to the foregoing Step 641, and determines whether or not it is a time of the regular report. Numeral 643*a* is a step that acts when the determination of the foregoing Step 642 is YES (it is the regular report time), and transmits a regular report packet 403*c* or 403*d* of FIG. 6. Numeral 643*b* is a step that acts subsequently to the fore going Step 642, and sends an address of the data to be regularly reported next. Subsequently to the foregoing Step 643*b*, the program proceeds to the above-mentioned operation end step 635.

Numeral 644 is a step that acts when the determination of the above-mentioned Step 640 is NO (regular report is not permitted yet), and determines whether or not the timer T3 having been started in the above-mentioned Step 603 is Time's Up. Numeral 645 is a step that acts when the determination of the foregoing Step 644 is YES and the regular report permission cannot be obtained despite waiting for a time period T3 after the start of operation, and adds 6 counts to a value of the operation means CN2 acting as the second adding-subtracting means. Numeral 646 is a step that acts subsequently to the foregoing-Step 645, and restarts the timer T3. Numeral 647 is a step that acts subsequently to the foregoing Step 646, and determines whether or not a current value of the operation means CN2 acting as the second adding-subtracting means exceeds 11. Numeral 648 is a step that acts when the determination of the foregoing Step 647 is YES (exceeding 11), and generates a pulse output of the second error detection signal ER2. Numeral 649 is a step that acts subsequently to the foregoing Step 648, and resets the first flag having been set in the above-mentioned Step 605. The program proceeds to the above-mentioned operation end step 635 when the determination of the above-mentioned Step 647 is NO (not more than 11) or subsequently to the above-mentioned Step 649.

In addition, numeral 636*b* is a step block consisting of the above-mentioned Steps 648 and 649, and acts as one of second initialization means.

Numeral 650 is a step that acts when the determination of the above-mentioned Step 644 is NO (it is not Time's Up) or the determination of the above-mentioned Step 642 is NO (it is not the regular report time), and determines whether or not there is any reply command having been stored in the unprocessed data table 204 in the above-mentioned step block 626. Numeral 651 is a step that acts when the determination of the foregoing Step 650 is YES (reply command is present), and reads out a reply command having been stored in the above-mentioned unprocessed data table 204 in a mode of first-in first-out. Numeral 652 is a step that acts subsequently to the foregoing Step 651, and discriminates whether or not a reply command having been read out in Step 651 is a readout request command having been stored in the above-mentioned Step 620. Numeral 653 is a step that acts when the discrimination of the foregoing Step 652 is YES (it is the readout request), and reports and replies a readout data relating to a memory of a specified address along with the corresponding address.

Numeral 654 is a step that acts subsequently to the above-mentioned step 653, and discriminates whether or not address of the data having been reported and replied in Step 653 is the address of a selected data memory in which the data has been written in the above-mentioned Step 607. Numeral 655 is a step that acts when the discrimination of the foregoing Step 654 is YES (it is the selected data memory), and resets the readout request flag having been set in the above-mentioned Step 608. The program proceeds to the above-mentioned operation end step 635 when the discrimination of the above-mentioned Step 654 is NO (it is not the selected data memory) or subsequently to the above-mentioned Step 655.

Numeral 660 is a step that acts when the discrimination of the above-mentioned Step 652 is NO (it is not the readout request), and discriminates whether a reply data having been read out in the above-mentioned Step 651 is an ACK-W (normal receiving with respect to the regular transmission) having been stored in the above-mentioned Step 621 or a NACK having been stored in the above-mentioned Step 625. Numeral 661 is a step that acts when the discrimination of the foregoing Step 660 is YES (ACK-W), and replies an acknowledged data ACK and the corresponding address. Numeral 662 is a step that acts when the determination of the above-mentioned Step 660 is NO (NACK), and replies a non-acknowledged data NACK and the corresponding address. The program proceeds to the above-mentioned operation end step 635 when the determination of the above-mentioned Step 650 is NO (reply data is absent) or subsequently to the above-mentioned Steps 661 and 662.

In addition, numeral 663 is a step block consisting of the above-mentioned Steps 661 and 662. The foregoing step block corresponds to the transmission of the confirmation reply packets 403a, 404a, 404b of FIGS. 4a and 4b, and the above-mentioned Step 653 corresponds to the report reply packet 403b of FIG. 5.

The heretofore operations are described in brief. With reference to FIGS. 9 and 10, numerals 636a and 636b are second initialization means that resets the first flag thereby carrying out Steps 602–604 in the next operation to initialize the second control circuit section 200b, and generates the second error detection signal ER2 to initialize and restart the first control circuit section 200a. Numeral 608 is readout request setting means with which the sub station requests for the master station to read out a content of any selected data memory of a specified address. Numeral 612 is second communication error determination means acting as receiving integral monitoring means of a regular transmission packet. Numeral 613 is second communication error determination means acting as bit information monitoring means relating to the data having been transmitted from the master station. Numeral 615 is second adding-subtracting means for subtracting the first variation value "1". Numeral 623 is second adding-subtracting means for adding the second variation value "3". Numeral 630 is second adding-subtracting means for adding the third variation value "6". Numeral 633 is second error occurrence definition means for generating the second error detection signal ER2.

Further, with reference to FIG. 10, numeral 643a is regular report means for transmitting a regular report packet. Numeral 644 is permitted time period determination means. Numeral 645 is second adding-subtracting means for adding the third variation value "6". Numeral 648 is second error occurrence definition means for generating the second error detection signal ER2. Numeral 653 is report reply means for transmitting a report reply packet with respect to the readout request. Numeral 663 is confirmation reply means for transmitting a confirmation reply packet of the normal receiving or the receiving failure.

In addition, the determination block 202 of FIG. 2 includes the second communication error determination means 612 acting as receiving interval monitoring means of a regular transmission packet and the second communication error determination means 613 acting as bit information monitoring means relating to data having been transmitted from the master station. Thus the determination block of FIG. 2 is second communication error determination means 613 itself acting as bit information monitoring means relating to data having been transmitted from the master station.

The action and operation are described in brief referring to FIGS. 1 and 2 in consideration the foregoing descriptions of the flowcharts in FIGS. 7 to 10.

With reference to FIG. 1, the main CPU 110a uses the first and second input sensor groups 102a an 102b and the first and second analog sensor groups 103a and 103b as input signal, and controls the first and second electrical load groups 104a and 104b based on a control program or a control constant that is stored in the non-volatile program memory 115a. However, the above-mentioned second input sensor group 102b, the second analog sensor group 103b and the second electrical load group 104b perform a serial communication indirectly with the main CPU 110a via the first and second series-parallel converters 117 and 127.

Additionally, although an analog output is not utilized in the foregoing first embodiment shown in FIG. 1, it is also possible to mount a DA converter for a meter display as an indirect output, if necessary.

When the first error detection signal ER1 is generated in the first control circuit section 200a, the first flag is rest in Step 517 of FIG. 7 or in Step 547 of FIG. 8, and then the program proceeds to the operation end step 518. Therefore, when the program goes to the operation start step 500 again, initialization of the first control circuit section 200a itself is carried out in Steps 502–505.

On the other hand, a reset pulse signal is inputted to a reset input terminal RST2 of the second control circuit section 200b with the first error detection signal ER1 whereby the second control circuit section 200b, being the other side, is initialized and restarted as well.

Likewise, when the second error detection signal ER1 is generated in the second control circuit section 200b, the first flag is rest in Step 634 of FIG. 9 or in Step 649 of FIG. 10, and then the program proceeds to the operation end step 635. Therefore, when the program goes to the operation start step 600 again, initialization of the second control circuit section 200b itself is carried out in Steps 602–605.

On the other hand, a reset pulse signal is input to a reset input terminal RST1 of the main CPU 110a in the first control circuit section 200a with the second error detection signal ER2 whereby the first control circuit section 200a, being the other side, is also initialized and restarted as well.

The first and second control circuit sections 200a and 200b are initialized and restarted also with a reset pulse signal RST1 from the watchdog timer (watchdog timer: a circuit that monitors an operation step of a computer, and detects any error operation of the system) 130. However, upon generation of the first and second error detection signals ER1 and ER2 or a reset pulse signal RST1 provided by the watchdog timer 130, the error storage circuit 131*a* stores this generation of signals to bring the alarm and display 108 in operation, and stops the operation of the load power supply relay 107*a* so that a power feed with respect to a part of specified electrical loads is stopped.

Accordingly, in the case where the main CPU 110 a temporarily malfunctions due to a noise malfunction, the main CPU is automatically restarted with reset pulse RST1. However, a drive stop state of a part of the electrical loads due to the operation stop of the load power supply relay 107*a* still continues.

Nevertheless, when the power supply switch 15*b* is turned on again, the error storage of the error storage circuit 131*a* is cleared thereby enabling to recover the normal operation state.

With reference to FIG. 2, basic transmit-receive data in this first embodiment are constituted of an output setting with a regular transmission packet from the master station to the sub station, and an input readout with a regular report packet from the sub station to the master station.

However, to prevent any erroneous output setting, a receiving confirmation reply from the sub station to the master station is carried out with respect to the transmission from the master station to the sub station.

Further, the master station can irregularly read out data on the sub station side by the readout request; and information of a specified address can be read out through the readout request by setting a readout request flag in a regular report also on the sub station side.

In addition, supposing that there is only a reciprocating communication in which a master station transmits and the sub station replies to this transmission, the master station waits for the reply from the sub station and, then, carries out the next transmission thereby enabling to prevent the jam-up of communication.

However, supposing that the sub station side intends to transmit the regular report to the master station without any command of the master station, the jam-up will occur in an upstream communication.

The unprocessed data table 204 is to make a queue of un-replied information and carries out the sequential replying when such jam-up occurs, thereby enabling to execute the regular transmission or the regular report on a timely basis.

Furthermore, it is arranged such that the regular report from the sub station is inhibited at the time of the operation start when there are a large amount of data of downstream communication, and that the main CPU 110*a* transmits an initial set data in a concentrated manner and executes the readout request with an irregular transmission packet on a timely basis thereby enabling to carry out the readout of an indirect input information.

Embodiment 2.

Figure 11:
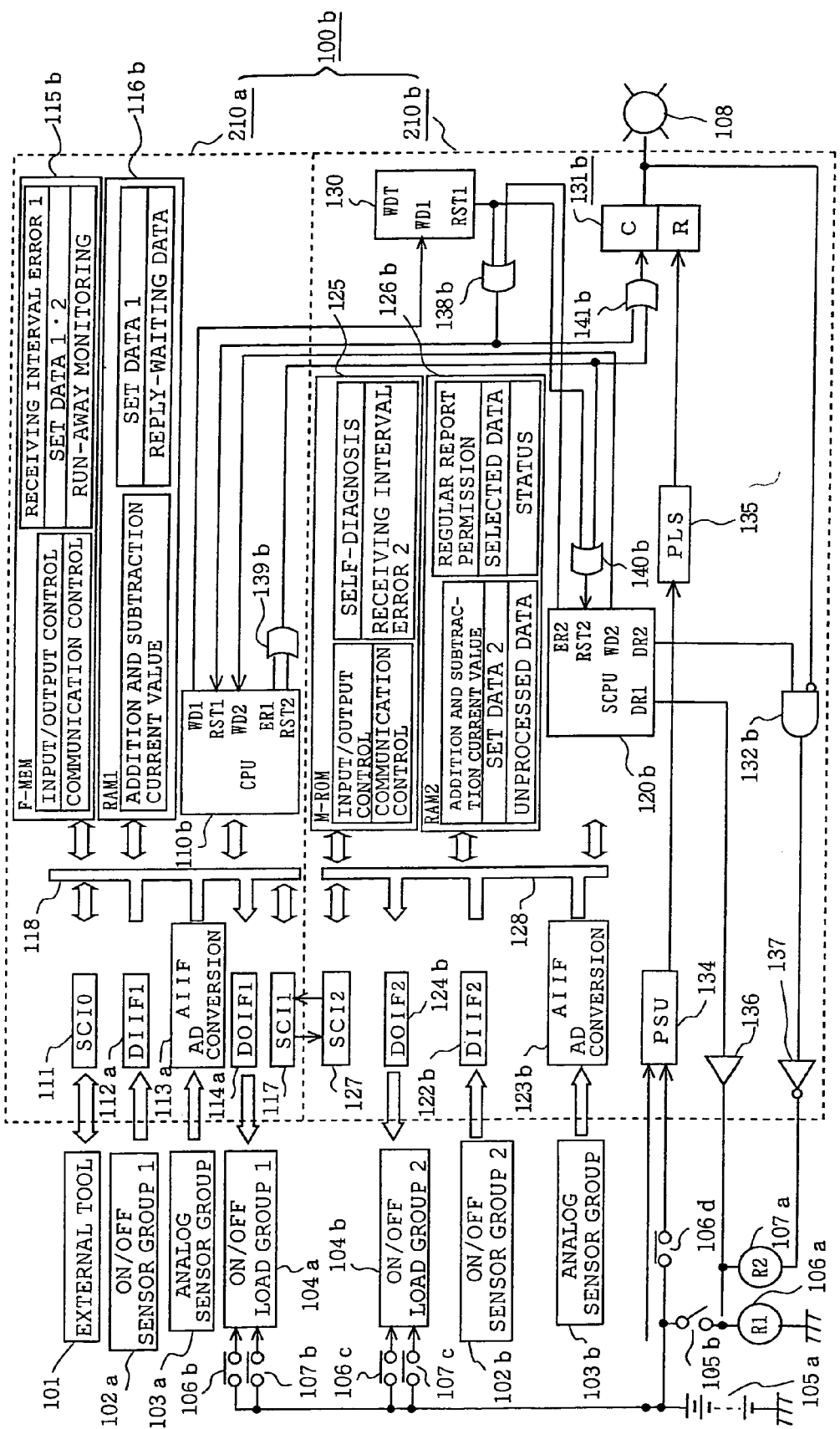
FIG. 11 is a block diagram showing an entire constitution of an electronic control unit according to a second preferred embodiment.

FIG. 11 is a block diagram showing an entire constitution of an electronic control unit according to a second preferred embodiment.

Hereinafter, constitution and operation of the electronic control unit according to the second embodiment are described, focusing on points different from the electronic control unit according to the foregoing first embodiment shown in FIG. 1.

With reference to FIG. 11, numeral 100*b* designates an electronic control unit that consists of a first control circuit section 210*a* and a second control circuit section 211*b*. Numeral 110*b* designates a main CPU (microprocessor). Numeral 115*b* designates a non-volatile program memory such as flash memory cooperating with the foregoing main CPU 110*b*. Written in the above-mentioned program memory 115*b* are a program acting as input/output control means, or a program acting as communication control means, as well as a set data to be transferred and written in the first and second set data memory 237*a* and 237*b* (refer to FIG. 2), a program acting as run-away monitoring means with respect to the later-described auxiliary CPU (microprocessor) 120*b*, or a program acting as first receiving interval error determination means.

Numeral 116*b* designates a RAM memory for an operation processing. Written in the foregoing RAM memory 116*b* are a current value data of the first adding-subtracting means 230*a* (refer to FIG. 2), a first set data having been transferred from the above-mentioned program memory 115*b*, or a reply-waiting command data.

Numeral 120*b* designates an auxiliary CPU (microprocessor). Numeral 125 designates an auxiliary program memory cooperating with the foregoing auxiliary CPU 120*b*. Stored in the foregoing auxiliary program memory 125 are a program acting as input/output control means in the second control circuit section 210*b* or *a* self-diagnosis program, or a communication control program or a program acting as second receiving interval error determination means.

Numeral 126*b* designates an auxiliary RAM memory. Written in the foregoing auxiliary RAM memory 126*b* are a current value data of the second adding-subtracting means 230*b* (refer to FIG. 2), a second set data having been transferred from the above-mentioned program memory 115*b*, or an unprocessed command data, as well as a regular report permission command data, a selected data, status information and the like.

In addition, the above-mentioned main CPU 110*b* monitors a pulse width of a watchdog clear signal WD2 that the auxiliary CPU 120*b* generates, and generates a reset pulse signal RST2 when the foregoing pulse width exceeds a predetermined value.

Numeral 131*b* designates a count storage circuit including a count input, a reset input and a count up output (error occurrence storage means). Numeral 138*b* designates an OR element with respect to a reset pulse signal RST1 that the above-mentioned watchdog timer 130 generates and the second error detection signal ER2 that the above-mentioned auxiliary CPU 120*b* generates. The main CPU 110*b* is reset and restarted in response to an output from the foregoing OR element 138*b*.

Numeral 139*b* designates an OR element with respect to the first error detection signal ER1 and the reset pulse signal RST2 that the above-mentioned main CPU generates. Numeral 140*b* designates an OR element with respect to the reset pulse signal RST1 that the above-mentioned watchdog timer 130 generates and an output from the above-mentioned OR element 139*b*. The above-mentioned auxiliary CPU 120*b* is reset and restarted in response to an output from the foregoing OR element 140*b*.

Numeral 141*b* designates an OR element with outputs from the above-mentioned OR elements 138*b* and 139*b* acting as inputs. An output terminal of the foregoing OR element 141*b* is connected to a count input terminal of the above-mentioned count storage circuit 131*b*.

In addition, the above-mentioned count storage circuit 131b counts and stores operation number of the above-mentioned reset pulse signals RST1 and RST2 or the first and second error detection signals ER1 and ER2. The above-mentioned count storage circuit 131b drives the above-mentioned alarm and display 108 when the foregoing count value is not less than a predetermined value, and a count storage value is reset by the power supply detection circuit 135 when the above-mentioned power supply switch 105b is closed.

Numeral 132b designates a gate circuit (drive stop means) Numeral 137 designates an inversion drive element that drives a load power supply relay 107a via the above-mentioned drive stop means 132b in response to a drive output DR2 that the auxiliary microprocessor 120b generates. The foregoing load power supply relay 107b operates when the drive output DR2 is generated, and the count storage circuit 131b does not count up.

In addition, the above-mentioned auxiliary CPU 120b generates a drive output DR1 to carry out an operation hold of a power supply relay 106b, and generates the second error detection signal ER2 or a watchdog clear signal WD2.

As is obvious in the above description, in the electronic control unit according to the foregoing first embodiment, shown in FIG. 1, the associative control circuit 120a is constituted of an integrated circuit element employing a logic circuit. Whereas, in the electronic control unit according to this second embodiment, shown in FIG. 11, an auxiliary CPU 120b is provided, thereby making it easy to apply the following processing. That is, in this second embodiment, not merely an indirect input signal provided by the second input sensor group 120b or the second analog sensor group 103b is transmitted to the main CPU 110b, but also, e.g., disconnection and short circuit detection of the input sensor group are carried out, or an OR coupling processing with respect to a plurality of input signals is carried out, and thereafter the resultant signals is transmitted to the main CPU 10b.

Likewise, in the electronic control unit according to the second embodiment, the auxiliary CPU 120b does not drive directly the second electrical load group 140b in response to an indirect output signal having been transmitted from the main CPU 110b, but a logic processing responsive to an input signal from the second input sensor group 120b can be easily applied as well.

Furthermore, the electronic control unit according to the second embodiment makes it easy to add a function to communicate a mutual monitoring information via the first and second series-parallel converters 117 and 127.

Figure 14:
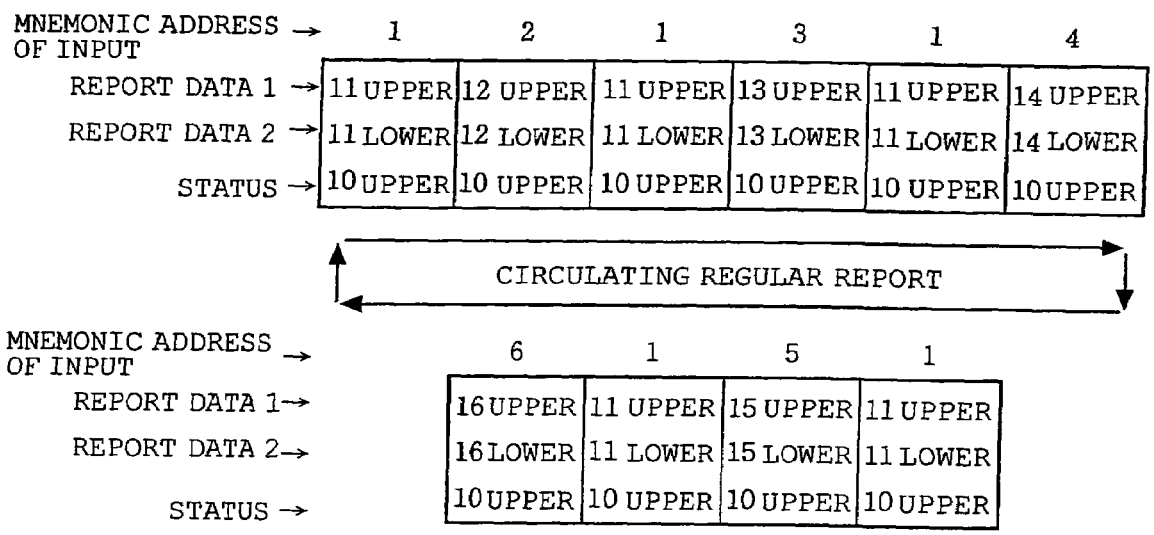
FIG. 14 is a diagram showing the relation of a regular report order in the electronic control unit according to the second embodiment.

FIGS. 12 to 14 show division of addresses to be specified in various communication packets in the electronic control unit according to this second embodiment shown in FIG. 11.

FIG. 12 is a control output and constant set data table, and shows an address division to be specified with a regular transmission packet 401a and a reply packet thereof, or an irregular transmission packet 401b and a reply packet thereof.

FIG. 13 is a monitoring input data table, and shows an address division to be specified with an irregular transmission packet 401b and a reply packet thereof.

Further, FIG. 14 is relation of a regular report order, and shows the relation between a mnemonic address to be specified within status information in the regular report packets 430c and 403d.

With reference to FIG. 12, addresses 01–08 show the addresses of the second set data memory 237b of FIG. 2 and a memory of storing a reply response acceptable time period or a receiving interval acceptable time period. An address 0A is the address with respect to indirect control outputs Y07–Y00 (Y00 corresponds to DR1, and Y01 corresponds to DR2), and an address 0B is the address with respect to indirect control outputs Y17–Y10. Data of each address is 8 bit data.

In addition, set data relating to addresses 01–08 are regularly transmitted in sequence at the time of start of the operation, and thereafter a permission command for the regular report is transmitted to the address 00. Since then, the address 0A and the address 0B are regularly transmitted alternately.

With reference to FIG. 13, addresses 10–17 are the addresses relative to a 16 bit data. However, a status memory of address 10 and a selected data memory of address 17 are as described later in detail referring to FIG. 15.

Further, an address 11 is the address relative to 16 points of indirect input X07 and X00, X17 and X10, and addresses 12–16 are the addresses of a digital conversion value relative to indirect analog inputs 1–5.

With reference to FIG. 14, a report data 1 and a report data 2 in the first regular report are the indirect analog input 1 and the indirect input 2 shown with the address 11 of FIG. 13. A report data 1 and a report data 2 at the next regular report are digital conversion values of the analog 1 shown in FIG. 13. A report data 1 and a report data 2 at the subsequent regular report are the indirect input 1 and the indirect input 2 again, shown with the address 11 of FIG. 13. A report data 1 and a report data 2 at the further subsequent regular report are digital conversion values of the analog 2 shown in FIG. 13.

The indirect inputs 1 and 2 and the analog 1 to 5 are regularly reported in sequence in the same manner.

Figure 15:
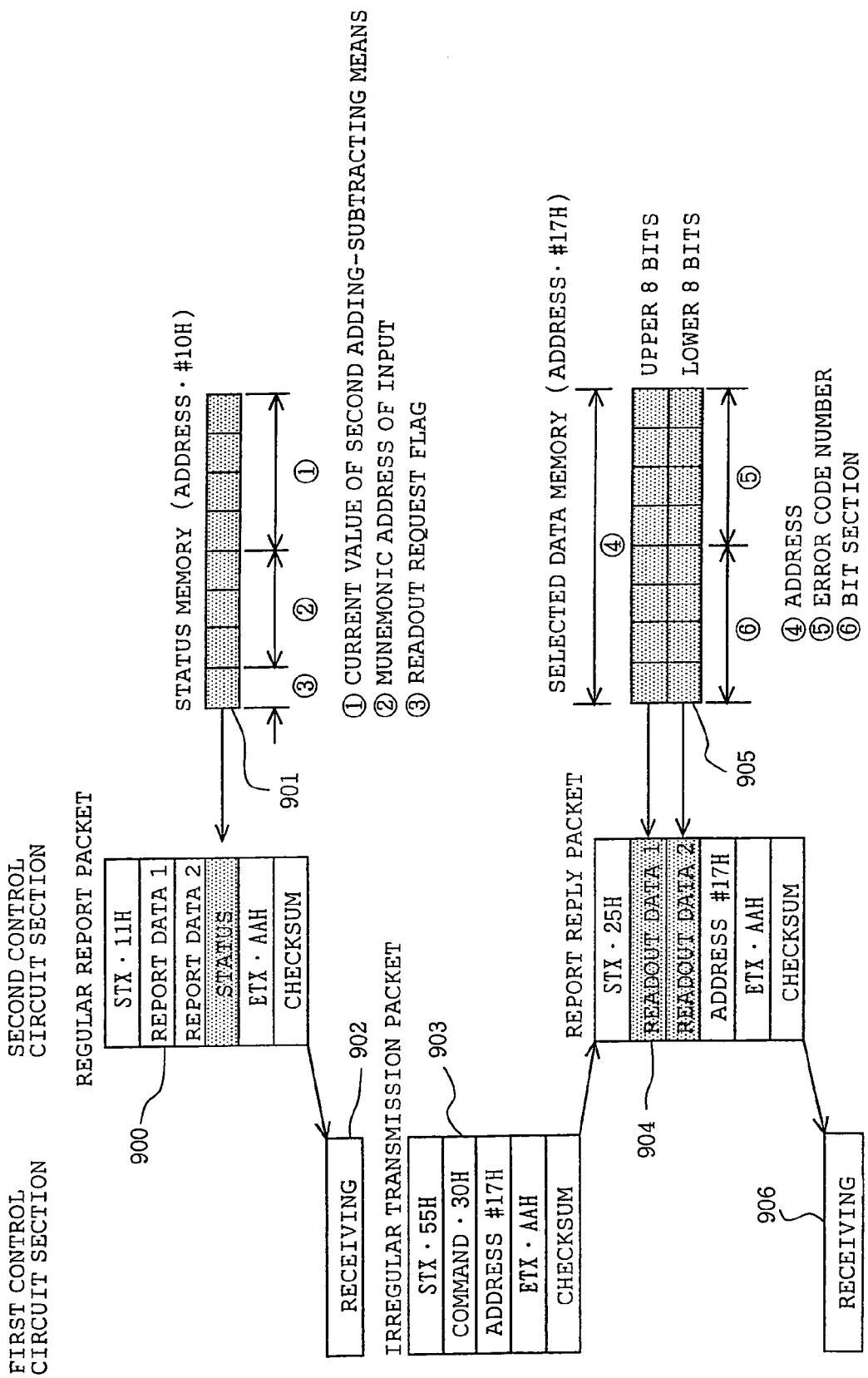
FIG. 15 is a diagram showing the constitution of a readout request transmit-receive packet in the electronic control unit according to the second embodiment.

FIG. 15 shows a constitution of a transmit-receive data relating to the selected data memory having been described in Step 607 of FIG. 9.

With reference to FIG. 15, numeral 900 designates a regular report packet that the second control circuit section 210b regularly transmits. In the foregoing regular report packet, digital conversion values of the above-mentioned second input sensor group 102b and the second analog sensor group 103b are sequentially stored in increment of 2 bites as a report data 1 and a report data 2, and further a status information 901 is stored every time.

The lower 4 bits of the above-mentioned status information 901 are a current value of the second adding-subtracting means 230b. The upper 3 bits are a mnemonic address of the above-mentioned report data 1 (value of lower single digit of a monitoring input address of FIG. 13). The uppermost bit is a readout request flag to be a logic level "1" when any error occurs in the second control circuit section 210b.

Numeral 902 designates an incoming processing block due to the fact that the first control circuit section 210a receives the above-mentioned regular report packet 900. Numeral 903 designates an irregular transmission packet with which the first control circuit section 210b carries out a readout request in response to the fact that a readout request flag is detected in the foregoing incoming processing block. An address of a readout location to be specified with the foregoing irregular transmission packet is and address #17H of a selected data memory.

Numeral 904 designates a report reply packet that the second control circuit section 210b having received the above-mentioned irregular transmission packet 903 transmits. As for a content of a selected data memory 905 to be read out with the foregoing report reply packet, the upper 8 bits show an address of the device where error occurs, the lower 4 bits in the lower 8 bits show an error code number, and the upper 4 bits in the lower 8 bits represent a bit section.

In addition, the term "bit section" herein is number information in order to specify an particular input/output with respect to an ON/OFF input/output at the addresses 0A and 0B or the address 11.

Numeral 906 designates a reply incoming processing block responsive to the fact that the first control circuit section 210a receives the above-mentioned report reply packet 904. With this reply incoming processing, the first control circuit section 210a is capable of acknowledging a site of the error occurrence in the second control circuit section 210b.

The basic constitution and operation of the electronic control units according to the foregoing first embodiment and the second embodiment have been described so far. Now, modifications thereof are hereinafter described.

In the above-mentioned electronic control units according to the first embodiment or the second embodiment, the confirmation reply or the report reply from the second control circuit section with respect to the first control circuit section is replied in sequence from in the unprocessed data table; while the regular report from the second control circuit section with respect to the first control circuit section is not contained in the unprocessed data table. However, it is practical to achieve unification of an upstream communication in such a manner that the foregoing regular report command is regularly stored in the unprocessed data table, and the latest report data is attached at the moment of practically reporting and transmitting on the first-in first-out basis.

Further, as for a reply report data to the irregular transmission command, the latest report data is attached and replied at the moment of being practically replied.

As for the rest, in the regular transmission from the first control circuit section with respect to the second control circuit section, it is preferable to sequentially carry out a refresh write as to the addresses 00 to 08 having been transmitted already at the time of the start of operation in such a manner of address 0A→address 00→address 0B→address 01→address 0A→address 02→address 0B→address 03→address 0A Furthermore, in the above-mentioned electronic control units according to the foregoing first embodiment or this second embodiment, there is provided the adding-subtracting means for subtracting the first variation value at the time of a normal communication, and adding the second variation value, which is a value larger than the above-mentioned first variation value, at the time of the occurrence of the communication error; and the error occurrence is defined when a current value of the foregoing adding-subtracting means exceeds a predetermined threshold. However, by setting the above-mentioned second variation value to be smaller than the above-mentioned threshold value, it is possible to avoid too sensitive error determination with respect to a sporadic and chronic error in which an abnormal state automatically recovers, and to carry out a retransmission processing in accordance with a history state of the past with respect to a fatal and continuous failure, and then define the error determination immediately.

However, as for the manner of arrangement of the adding-subtracting means, it is preferable that, for example, the lower limit value is set to "−9", an initial value "0", and the upper limit value "3"; and a current value of the adding-subtracting means decreases to "−9" in case of the continuation of a normal communication, the addition with respect to a current value is carried out in case of presence of the communication error, and the error occurrence is defined when this current value exceeds the upper limit value "3".

Furthermore, it is preferable that direction of the addition and subtraction is inverted, for example, a normal-side upper limit value is set to "11", an initial value "3", and an error determination lower limit value "0"; and a current value of the adding-subtracting means increases to "11" in case of continuation of the normal communication, the subtraction with respect to a current value is carried out in case of the presence of the communication error, and the error occurrence is defined when this current value comes to be less than the lower limit value "0".

Additionally, in the above-mentioned electronic control units according to the foregoing first embodiment or this second embodiment, it is arranged such that with respect to various communication errors such as a sum check error and a timeout error due to the reply delay or the receiving interval error, adding-subtracting means counts a current dangerous state overall, and number of times of the retransmission processing depending upon quantity of allowance up to an error determination threshold value is also determined in a unitary manner.

However, depending upon various communication errors such as a sum check error and a timeout error due to the reply delay or the receiving interval error, weighting of a variation value to compensate a current value of the adding-subtracting means is determined experimentally and statistically in accordance with a practical-use target, and determined in accordance with an intended degree of safety.

Thus, it is desirable that data of a part or all of various control constants including first variation value, second variation value, third variation value, normal-side limit value, abnormal-side limit value, and initial value to be processed in the above-mentioned first and second adding-subtracting means, or data of a apart or all of various control constants including permitted value of a reply response time period or a receiving interval time period to be used in the above-mentioned first communication error determination means, is transferred and written from the non-volatile program memory cooperating with the main CPU, and the setting change of these constants can be carried out if necessary.

Furthermore, in the above-mentioned electronic control units according to the foregoing first embodiment or this second embodiment, both first and second control circuit sections are described so as to include a control input and a control output that are externally connected. For example, however, it is preferable that the second control circuit section is not provided with any external input/output, and intends to carry out the monitoring control with respect to the first control circuit section.

In this case, it is also preferable that a monitoring target information is transmitted from the first control circuit section to the second control circuit section, and an analysis filed information is transmitted from the second control circuit section to the first control circuit section; and that in case of the presence of error in a monitoring result, this monitoring result error is algebraically added to adding-subtracting means for use in the above-mentioned communication error determination as a compensation variation value.

As for the rest, it is possible that the electronic control unit is applied for use in, for example, a programmable controller arranged such that the first and second control circuit sections are provided remote, and a large number of remote input/output signals are mutually communicated by a serial communication to save number of wiring.

Further, in the above-mentioned electronic control units according to the foregoing first embodiment or this second embodiment, a microprocessor is automatically restarted at the time of the occurrence of error, and arrangements are made so as to continue the operation of the devices as long as possible. It is, however, also possible to change arrangement so that the microprocessor is stopped at the time of occurrence of any error, and can be restarted only at the time of application of manual operation.

Further, it is preferable that, as annunciation means at the time of the occurrence of error at, e.g., an unattended operation facility, an error occurrence time instant is merely saved and an external tool is connected on a timely basis to read out and display a history information, or a printing output with the use of a printer is performed at the time of the occurrence of error.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An electronic control unit comprising:
   a first control circuit section containing a program memory, an operation processing RAM memory, a microprocessor, and a first series-parallel converter; and
   a second control circuit section containing a communication control circuit section at least for carrying out communication of monitoring and control signals, a data memory, and a second series-parallel converter,
   wherein serial communication of monitoring and control signals is carried out mutually between said first and second control circuit sections via said first and second series-parallel converters,
   wherein said first control circuit section includes regular transmission means and irregular transmission means, and said second control circuit section includes regular report means and an unprocessed data table,
   wherein said regular transmission means acts as write setting means that regularly transmits control output data or constant set data from said first control circuit section with respect to said second control circuit section, and executes a retransmission processing from the first control circuit section to the second control circuit section if any communication error in a confirmation reply of whether or not the second control circuit section has received said regular transmission data, is present,
   wherein said regular report means acts as one-way input readout means which regularly reports monitoring input data and status information from said second control circuit section to said first control circuit section, whereby no confirmation reply of whether or not the first control circuit section has received said regular report data is carried out,
   wherein said irregular transmission means operates as transmission means that is applicable when any error is present in a report communication provided by said regular report means, and is applied if a readout request for monitoring input data of a specified address from said first control circuit section to said second control circuit section is required, and if a readout request for reading out and checking a write save data having been written and set by said regular transmission means is required;
   wherein said irregular transmission means further operates as readout request means that makes a readout request from the first control circuit section to the second control circuit section if any communication error in a report reply of a monitoring input data of a specified address or a write save data is present, said report reply being carried out as a confirmation reply related said second control circuit section having received said irregular transmission data,
   wherein said unprocessed data table operates as a receiving-side command memory arranged so as to sequentially save command data for executing a confirmation reply when said second control circuit section receives any transmission data from said first control circuit section, and to sequentially erase said saved data when said second control circuit section transmits the confirmation reply data to said first control circuit section; and the transmission of a regular report data is carried out while preventing upstream communication jam-up from said second control circuit section to said first control circuit section with said unprocessed data table.

2. The electronic control unit according to claim 1, wherein said first control circuit section comprises a reply-waiting data table and retransmission means,
   wherein said reply-waiting data table operates as a transmission-side command memory arranged so as to sequentially save a transmission command that said first control circuit section has transmitted to said second control circuit section with regular transmission means and irregular transmission means, and to sequentially erase said saved command when receiving a confirmation reply data or a report reply data from the second control circuit section,
   wherein said retransmission means operates when there is any communication error in a confirmation reply or a report reply to said regular transmission means or irregular transmission means, or when a leading transmission command having been stored in said transmission-side command memory is not erased even after a predetermined time period has passed, and transmits transmission data based on said error transmission command; and
   wherein a transmission command having been transmitted again is deleted from and re-stored in said transmission-side command memory, and a first-in first-out processing is carried out.

3. The electronic control unit according to claim 1, wherein said second control circuit section comprises readout request setting means,
   wherein said readout request setting means operates as means for making the request for the readout of a selected data memory of a specified address that is provided in said second control circuit section by adding a readout request flag to status information contained in said regular report means, and
   wherein said first control circuit section is arranged so as to operate when there is a communication error in said regular report data, or when said readout request is present, and is operable to make a readout request for a regular report content or a selected data memory with said irregular transmission means.

4. The electronic control unit according to claim 1, wherein at least one of said regular transmission means or regular report means comprises division circulating means, and
   wherein said division circulating means operates as means that divides a large number of control output data intended to be regularly transmitted or a large number of monitoring input data intended to be regularly reported, and sequentially divides and transmits or sequentially divides and reports in a cycle corresponding to a required emergency degree, whereby a data amount to be transmitted or reported at a single communication is suppressed.

5. The electronic control unit according to claim 1, wherein said first control circuit section comprises regular report permission means; and
   said regular report permission means operates as means for storing command data that is transmitted by said regular transmission means to a memory of a predetermined address provided in said second control circuit section, and operates to permit the second control circuit section to transmit said regular report.

6. An electronic control unit comprising:
   a first control circuit section containing a program memory, an operation processing RAM memory, a microprocessor, and a first series-parallel converter; and a second control circuit section containing a communication control circuit section at least for carrying out communication of monitoring and control signals, a data memory, and a second series-parallel converter,
   wherein serial communication of monitoring and control signals is carried out mutually between said first and second control circuit sections via said first and second series-parallel converters,
   wherein said first control circuit section includes regular transmission means and irregular transmission means, and said second control circuit section includes regular report means; said first and second control circuits section include first and second communication error determination means, first and second adding-subtracting means, and first and second error occurrence definition means respectively, and said first control circuit section includes retransmission means,
   wherein said regular transmission means operates as write setting means that regularly transmits control output data or constant set data from said first control circuit section to said second control circuit section, and executes retransmission processing from the first control circuit section to the second control circuit section if any communication error in confirmation reply of whether or not the second control circuit section has received said regular transmission data is present,
   wherein said regular report means operates as one-way input readout means which regularly reports monitoring input data and status information from said second control circuit section to said first control circuit section, whereby no confirmation reply of whether or not the first control circuit section has received said regular report data is carried out,
   wherein said irregular transmission means operates as transmission means that is applicable when any error is present in a report communication provided by said regular report means, and is applied if a readout request for monitoring input data of a specified address from said first control circuit section to said second control circuit section is required, and if a readout request for reading out and checking a write save data having been written and set by the mentioned regular transmission means is required,
   wherein said irregular transmission means operates as readout request means that makes a readout request from the first control circuit section to the second control circuit section if any communication error in a report reply of a monitoring input data of a specified address or a write save data is present, said report reply being carried out as a confirmation reply to said second control circuit section having received said irregular transmission data,
   wherein said first and second communication error determination means operate as plural types of receiving error determination means that determine presence or absence of any error regarding various regular and irregular communication packets that a control circuit section on the side where the mentioned determination means is provided has received from the other control circuit section, or that determine a state that any communication packet to be received cannot be received,
   wherein said first and second adding-subtracting means operate as operation means that adds or subtracts a second variation value when any of said plural types of receiving error determination means determines the presence of error, and subtracts or adds a first variation value when all the receiving error determination means determine the absence of any error to perform an addition-subtraction compensation with respect to a current value memory so as to offset each other, and stops an addition-subtraction compensation with said first variation value at a predetermined normal-side limit value when the determination of the absence of error continues,
   wherein said first and second error occurrence definition means operate as comparison means that generate first and second error detection signals when a current value of said adding-subtracting means gets out of a scope of a predetermined abnormal-side limit value as a result of accumulation of said first and second variation values,
   wherein said retransmission means operate when any error is present in a transmission data provided from said first control circuit section to the mentioned second control circuit section, or when error is present in a confirmation reply data in response to said transmission data, and with which the first control circuit section transmits a communication packet corresponding to the old transmission command, and adds or subtracts a second variation value with respect said first adding-subtracting means, and
   wherein said second variation value is set to a value smaller than a permitted accumulation value, being a difference between said abnormal-side limit value and normal-side limit value, and stopping the operation, or initialization and restart of said first or second control circuit section is carried out responsive to the occurrence of said error detection signal.

7. The electronic control unit according to claim 6, wherein said first and second control circuit sections comprise first and second initialization means,
   wherein said first initialization means operates as means that operates when said-first error occurrence definition means generates an error detection signal, resets a current value of said first adding-subtracting means at a predetermined initialization value at the start of operation, and initializes and restarts a communication control circuit section provided in said second control circuit section,
   wherein said second initialization means operates as means that operates when said second error occurrence definition means generates an error detection signal, resets a current value of said second adding-subtracting means at a predetermined initialization value at the start of operation, and initializes to restart or stop the operation of a microprocessor provided in said first control circuit section, and wherein an initialization value of the first and second adding-subtracting means to be reset by said first and second initialization means is a value close to said abnormal-side limit value from said normal-side limit value.

8. The electronic control unit according to claim 6, wherein said first and second communication error determination means comprise at least one of bit information monitoring means and reply delay monitoring means or receiving interval monitoring means, wherein said bit information monitoring means operates as bit error determination means for determining presence or absence of any lack or mix in bit information such as parity check or sum check relative to a serial data communicated between said first and second control circuit sections, wherein said reply delay monitoring means operates as reply response error determination means for making an error determination at the first control circuit section, being a source side when a reply data from said second control circuit section in response to any data, which said first control circuit section has transmitted, cannot be received even when a predetermined reply response time period has passed, wherein said receiving interval monitoring means operates as receiving interval error determination means for making an error determination when a receiving interval time period of the other-side control circuit section with respect to a regular transmission data that said first control circuit section transmits or a regular report data that said second control circuit section transmits exceeds a predetermined value, and wherein said adding-subtracting means performs an addition-subtraction compensation with a first variation value when none of said bit information monitoring means, reply delay monitoring means, and receiving interval monitoring means makes an error determination.

9. The electronic control unit according to claim 8, wherein said second variation value, which said adding-subtracting means adds or subtracts when the determination of said bit information monitoring means is a communication error, is a value larger than said first variation value; and wherein a variation value, which said adding-subtracting means adds or subtracts when the determination of said reply delay monitoring means or receiving interval monitoring means is a communication error, is a third variation value, being a value different from said second variation value; and further said third variation value is a value smaller than a permitted accumulation value, being a difference between said abnormal-side limit value and normal-side limit value.

10. The electronic control unit according to claim 8, wherein said first control circuit section comprises a reply-waiting data table, wherein said reply-waiting data table operates as a transmission-side command memory arranged so as to sequentially save a transmission command, which said first control circuit section has transmitted to said second control circuit section, and to erase saved command when said first control circuit section has received a confirmation reply data from said second control circuit section, and wherein said reply delay monitoring means operates as reply error determination means for making an error determination when a save time period of leading data remained in said transmission-side command memory exceeds a predetermined value, and a command determined as a reply error and wherein a command having a confirmation reply of any receiving failure are sequentially deleted from said transmission-side command memory, and stored anew in the transmission-side command memory at the time of being transmitted again.

11. The electronic control unit according to claim 8, wherein said first control circuit section comprises a first set data memory;

wherein said first set data memory acts as a data memory in which stored is a part or all of various control constants such as first variation value, second variation value, normal-side limit value, abnormal-side limit value, or initial value to be processed in said first adding-subtracting means; or a part or all of various control constants such as permitted values of a reply response time period or a receiving interval time period to be used in said first communication error determination means; and wherein a part or all of said various control constants are transferred and written from a non-volatile program memory cooperating with said microprocessor.

12. The electronic control unit according to claim 8, wherein said second control circuit section comprises a second set data memory, wherein said second set data memory operates as a data memory in which a part or all of various control constants such as first variation value, second variation value, normal-side limit value, abnormal-side limit value, or initial value to be processed in said second adding-subtracting means are stored; or wherein a part or all of various control constants such as permitted value of a receiving interval time period to be used in said second communication error determination means are stored, and wherein a part or all of said various control constants are transmitted and written from a non-volatile program memory cooperating with said microprocessor via said first and second series-parallel converters.

13. The electronic control unit according to claim 6, wherein said second control circuit section comprises current value report means, wherein said current value report means operates as means for adding a current value of said second adding-subtracting means to said status information, and regularly reporting result information to said first control circuit section.

14. The electronic control unit according to claim 6, wherein said first control circuit section comprises a direct input/output signal interface circuit, and either said first or second control circuit section comprises a watchdog timer and error occurrence storage means, wherein said direct input/output signal interface circuit is bus-connected to said microprocessor, wherein said microprocessor is arranged so as to generate an output signal in response to a direct input signal having been inputted via said direct input signal interface, an indirect input signal having been received by serial communication from a second series-parallel converter provided in said second control circuit section, and a content of said program memory to drive an electrical load group, which is connected to said direct output signal interface circuit, and to transmit an indirect output signal via said first and second series-parallel converters to the second control circuit section, wherein said watchdog timer operates as a run-away monitoring timer circuit that monitors a watchdog clear signal, being a pulse train, which said microprocessor generates, and generates a reset pulse signal when a pulse width of said watchdog clear signal exceeds a predetermined value, wherein error occurrence storage means operates as an error storage circuit that stores said first and second error detection signals or a reset pulse signal to bring annunciation means such as alarm, display, printing, and history save in operation when said error detection signals are generated, and when the reset pulse signal provided by said watchdog timer is generated, and wherein said microprocessor is initialized and restarted when said watchdog timer generates a reset pulse signal and when said second error detection signal is generated, and a communication control circuit section of said second control circuit section is initialized and restarted when said watchdog timer generates a reset pulse signal and when said first error detection signal is generated.

15. The electronic control unit according to claim 14, wherein said second control circuit section comprises an auxiliary CPU, and said first control circuit section comprises run-away monitoring means with respect to said auxiliary CPU, wherein said auxiliary CPU operates as a microprocessor that is contained in said second control circuit section along with an auxiliary program memory cooperating with said auxiliary CPU, an operation processing auxiliary RAM memory, an indirect input/output signal interface circuit and a second series-parallel converter, transmits an indirect input signal associated with a signal having been inputted via said indirect input signal interface circuit to the first control circuit section via said first and second series-parallel converters, and drives an electrical load group that are connected to said indirect output signal interface circuit with an output associated with an indirect output signal having been received from said first control circuit section via said first and second series-parallel converters, wherein said run-away monitoring means operates as means for monitoring with said microprocessor a watchdog clear signal, being a pulse train that said auxiliary CPU generates, and generating a reset pulse signal when a pulse width of said watchdog clear signal exceeds a predetermined value, and wherein when said run-away monitoring means generates a reset pulse signal, when said watchdog timer generates a reset pulse signal and when said first error detection signal is generated, said auxiliary CPU is initialized and restarted, and said error storage circuit is arranged to store the occurrence of error.

16. The electronic control unit according to claim 14, wherein said error occurrence storage means is constituted of a count storage circuit, wherein said count storage circuit counts an OR output with respect to said first and second error detection signals and a reset pulse signal provided by the watchdog timer or the run-away monitoring means, and brings said annunciation means in operation when said count value reaches a predetermined value.

17. The electronic control unit according to claim 14, wherein at least one of said first and second control circuit sections comprises driving stop means and clear means, wherein said driving stop means operates as a gate circuit that operates when said error occurrence storage means stores an error occurrence to inhibit driving of specified electrical loads, being a part of said electrical load group, and wherein said clear means operates as means for initializing an error storage signal provided by said error occurrence storage means by manual operation such as turning on a power supply switch again.

18. The electronic control unit according to claim 16, wherein at least one of said first and second control circuit sections comprises driving stop means and clear means, wherein said driving stop means operates as a gate circuit that operates when a count value of said count storage circuit is not less than a predetermined value to inhibit driving of specified electrical loads, being a part of said electrical load group, and wherein said clear means operates as means for initializing a current value of said count storage circuit by manual operation such as turning on a power supply switch.

* * * * *